(12) United States Patent
van Voorst Vader

(10) Patent No.: US 11,800,610 B2
(45) Date of Patent: *Oct. 24, 2023

(54) METHOD OF DRIVING AN EMITTER ARRAY

(71) Applicant: Lumileds LLC, San Jose, CA (US)

(72) Inventor: Pieter Johannes Quintus van Voorst Vader, Son (NL)

(73) Assignee: Lumileds LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/873,456

(22) Filed: Jul. 26, 2022

(65) Prior Publication Data

US 2022/0369436 A1 Nov. 17, 2022

Related U.S. Application Data

(63) Continuation of application No. 16/657,475, filed on Oct. 18, 2019, now Pat. No. 11,438,977.

(30) Foreign Application Priority Data

Oct. 19, 2018 (EP) ..................................... 18201408

(51) Int. Cl.
*H05B 45/20* (2020.01)
*H05B 45/10* (2020.01)
(Continued)

(52) U.S. Cl.
CPC ............... *H05B 45/10* (2020.01); *B60Q 1/02* (2013.01); *F21S 41/153* (2018.01); *G03B 15/05* (2013.01);
(Continued)

(58) Field of Classification Search
CPC ........ H05B 45/24; H05B 45/28; H05B 45/32; H05B 45/44; H05B 45/325; H05B 47/105; H05B 47/125; H05B 47/155
See application file for complete search history.

(56) References Cited

U.S. PATENT DOCUMENTS 5,184,114 A 2/1993 Brown
6,411,046 B1 6/2002 Muthu
(Continued)

FOREIGN PATENT DOCUMENTS

CN 204077513 U 1/2015
DE 102015016375 A1 6/2017
(Continued)

OTHER PUBLICATIONS

"U.S. Appl. No. 16/456,835, Non Final Office Action dated Jun. 11, 2020", 9 pgs.
(Continued)

*Primary Examiner* — Tung X Le
(74) *Attorney, Agent, or Firm* — Schwegman, Lundberg & Woessner, P.A.

(57) ABSTRACT

Methods and apparatus for driving an emitter array are described. A method includes determining a thermal environment profile for a plurality of emitters of the emitter array, computing a current pulse profile for at least one of the plurality of emitters based on the thermal environment profile, and applying a current pulse with the computed current pulse profile to the at least one of plurality of emitters.

20 Claims, 18 Drawing Sheets

(51) Int. Cl.
*F21S 41/153* (2018.01)
*B60Q 1/02* (2006.01)
*G03B 15/05* (2021.01)
*F21Y 105/16* (2016.01)
*F21Y 115/10* (2016.01)

(52) U.S. Cl.
CPC ....... *F21Y 2105/16* (2016.08); *F21Y 2115/10* (2016.08)

(56) References Cited

U.S. PATENT DOCUMENTS

| | | | |
|---|---|---|---|
| 6,611,610 | B1 | 8/2003 | Stam et al. |
| 6,728,393 | B2 | 4/2004 | Stam et al. |
| 6,933,956 | B2 | 8/2005 | Sato et al. |
| 7,432,967 | B2 | 10/2008 | Bechtel et al. |
| 7,526,103 | B2 | 4/2009 | Schofield et al. |
| 9,318,069 | B2 | 4/2016 | Nambi et al. |
| 9,849,827 | B2 | 12/2017 | Uchida et al. |
| 10,148,938 | B2 | 12/2018 | Nagasaki et al. |
| 10,219,348 | B1 | 2/2019 | Chung |
| 10,651,357 | B2 | 5/2020 | Andrews |
| 11,395,392 | B2 * | 7/2022 | Squillace ............... H05B 45/46 |
| 2001/0026646 | A1 | 10/2001 | Morita et al. |
| 2002/0142504 | A1 | 10/2002 | Feldman et al. |
| 2002/0186192 | A1 * | 12/2002 | Maruoka ............... G09G 3/3614 345/87 |
| 2003/0038983 | A1 | 2/2003 | Tanabe et al. |
| 2003/0058262 | A1 | 3/2003 | Sato et al. |
| 2003/0222893 | A1 | 12/2003 | Koester et al. |
| 2004/0095184 | A1 | 5/2004 | Oka et al. |
| 2004/0114379 | A1 | 6/2004 | Miller et al. |
| 2004/0119667 | A1 | 6/2004 | Yang |
| 2004/0129887 | A1 | 7/2004 | Vydrin et al. |
| 2004/0252874 | A1 | 12/2004 | Yamazaki |
| 2005/0029872 | A1 | 2/2005 | Ehrman et al. |
| 2005/0200311 | A1 | 9/2005 | Youle |
| 2006/0017688 | A1 | 1/2006 | Hohmann et al. |
| 2006/0114201 | A1 * | 6/2006 | Chang ................. H05B 45/325 345/83 |
| 2006/0237636 | A1 | 10/2006 | Lyons et al. |
| 2007/0242337 | A1 | 10/2007 | Bradley |
| 2008/0129206 | A1 | 6/2008 | Stam et al. |
| 2008/0203945 | A1 | 8/2008 | Deurenberg et al. |
| 2009/0040152 | A1 | 2/2009 | Scheibe |
| 2009/0040775 | A1 | 2/2009 | Scheibe |
| 2009/0251071 | A1 * | 10/2009 | Gater ................. H05B 45/3725 315/297 |
| 2009/0322429 | A1 | 12/2009 | Ivanov et al. |
| 2010/0073358 | A1 | 3/2010 | Ozaki |
| 2010/0074610 | A1 | 3/2010 | Trevelyan |
| 2010/0097525 | A1 | 4/2010 | Mino |
| 2010/0134040 | A1 | 6/2010 | Elder |
| 2010/0259182 | A1 | 10/2010 | Man et al. |
| 2010/0301777 | A1 | 12/2010 | Kraemer |
| 2011/0012891 | A1 | 1/2011 | Cheng et al. |
| 2011/0062872 | A1 | 3/2011 | Jin et al. |
| 2012/0105228 | A1 | 5/2012 | Loveland et al. |
| 2012/0286135 | A1 | 11/2012 | Gong et al. |
| 2012/0287144 | A1 | 11/2012 | Gandhi et al. |
| 2012/0306370 | A1 | 12/2012 | Van De Ven et al. |
| 2013/0082604 | A1 | 4/2013 | Williams et al. |
| 2014/0267329 | A1 | 9/2014 | Lee et al. |
| 2015/0138212 | A1 | 5/2015 | Bae et al. |
| 2015/0151671 | A1 | 6/2015 | Refior et al. |
| 2015/0186098 | A1 | 7/2015 | Hall |
| 2016/0081028 | A1 | 3/2016 | Chang et al. |
| 2016/0081148 | A1 * | 3/2016 | Liang .................... G01R 31/44 324/414 |
| 2016/0104418 | A1 | 4/2016 | Keum et al. |
| 2016/0155406 | A1 | 6/2016 | Lee |
| 2016/0275919 | A1 | 9/2016 | Lawrence et al. |
| 2016/0345392 | A1 | 11/2016 | Scenini et al. |
| 2017/0243532 | A1 | 8/2017 | Huang et al. |
| 2018/0070417 | A1 * | 3/2018 | Galvano ............. H05B 45/3725 |
| 2018/0074199 | A1 | 3/2018 | Lin et al. |
| 2018/0079352 | A1 | 3/2018 | Dalal |
| 2018/0107288 | A1 | 4/2018 | Lohbihler et al. |
| 2018/0190880 | A1 | 7/2018 | Vampola et al. |
| 2019/0057643 | A1 | 2/2019 | Bae et al. |
| 2019/0132917 | A1 | 5/2019 | Veenstra et al. |
| 2019/0189879 | A1 | 6/2019 | Tandon et al. |
| 2020/0079278 | A1 | 3/2020 | Bonne et al. |
| 2020/0079280 | A1 | 3/2020 | Bonne et al. |
| 2020/0082503 | A1 | 3/2020 | Bonne et al. |
| 2020/0082749 | A1 | 3/2020 | Bonne |
| 2020/0084848 | A1 | 3/2020 | Bonne et al. |
| 2020/0084853 | A1 | 3/2020 | Bonne et al. |
| 2020/0084854 | A1 | 3/2020 | Bonne et al. |
| 2020/0084868 | A1 | 3/2020 | Bonne |
| 2020/0128640 | A1 | 4/2020 | Van Voorst Vader |
| 2021/0105874 | A1 | 4/2021 | Jain |

FOREIGN PATENT DOCUMENTS

| | | |
|---|---|---|
| EP | 2626851 A2 | 8/2013 |
| JP | 2002247614 A | 8/2002 |
| KR | 101846329 B1 | 4/2018 |
| TW | 201110811 A | 3/2011 |
| TW | 201640956 A | 11/2016 |
| WO | WO-2009140963 A1 | 11/2009 |
| WO | WO-2013066017 A1 | 5/2013 |
| WO | WO-2014062425 A1 | 4/2014 |
| WO | WO-2020053716 A1 | 3/2020 |
| WO | WO-2020053717 A1 | 3/2020 |
| WO | WO-2020053718 A2 | 3/2020 |
| WO | WO-2020053719 A1 | 3/2020 |

OTHER PUBLICATIONS

"U.S. Appl. No. 16/456,835, Notice of Allowance dated Jan. 27, 2020", 9 pgs.

"U.S. Appl. No. 16/456,835, Notice of Allowance dated Oct. 8, 2020", 9 pgs.

"U.S. Appl. No. 16/456,844, Non Final Office Action dated Feb. 5, 2020", 8 pgs.

"U.S. Appl. No. 16/456,844, Notice of Allowance dated Aug. 6, 2020", 5 pgs.

"U.S. Appl. No. 16/456,858, Non Final Office Action dated Feb. 20, 2020", 11 pgs.

"U.S. Appl. No. 16/456,858, Notice of Allowance dated Aug. 28, 2020", 6 pgs.

"U.S. Appl. No. 16/456,862, Final Office Action dated Sep. 14, 2020", 15 pgs.

"U.S. Appl. No. 16/456,862, Non Final Office Action dated Mar. 6, 2020", 15 pgs.

"U.S. Appl. No. 16/456,868, Non Final Office Action dated Apr. 1, 2020", 9 pgs.

"U.S. Appl. No. 16/456,874, Non Final Office Action dated Aug. 5, 2020", 7 pgs.

"U.S. Appl. No. 16/657,475, Examiner Interview Summary dated May 6, 2022", 2 pgs.

"U.S. Appl. No. 16/657,475, Final Office Action dated Apr. 26, 2022", 12 pgs.

"U.S. Appl. No. 16/657,475, Non Final Office Action dated Oct. 25, 2021", 12 pgs.

"U.S. Appl. No. 16/657,475, Notice of Allowance dated May 24, 2022", 11 pgs.

"U.S. Appl. No. 16/657,475, Response filed Jan. 25, 2022 to Non Final Office Action dated Oct. 25, 2021", 11 pgs.

"U.S. Appl. No. 16/657,475, Response filed May 12, 2022 to Final Office Action dated Apr. 26, 2022", 10 pgs.

"European Application Serial No. 18201763.2, European Search Report dated Feb. 8, 2019", 1 pg.

"European Application Serial No. 18202319.2, Extended European Search Report dated Feb. 12, 2019", 10 pgs.

"European Application Serial No. 18203445.4, Partial European Search Report dated Apr. 12, 2019", 14 pgs.

(56) References Cited

OTHER PUBLICATIONS

"International Application Serial No. PCT/EP2019/077305, International Search Report dated Nov. 21, 2019", 4 pgs.
"International Application Serial No. PCT/EP2019/077305, Written Opinion dated Nov. 21, 2019", 11 pgs.
"International Application Serial No. PCT/IB2019/057504, International Search Report dated Nov. 18, 2019", 3 pgs.
"International Application Serial No. PCT/IB2019/057504, Written Opinion dated Nov. 18, 2019", 5 pgs.
"International Application Serial No. PCT/IB2019/057506, International Search Report dated Oct. 31, 2019", 4 pgs.
"International Application Serial No. PCT/IB2019/057506, Written Opinion dated Oct. 31, 2019", 10 pgs.
"International Application Serial No. PCT/IB2019/057507, International Search Report dated Apr. 24, 2020", 6 pgs.
"International Application Serial No. PCT/IB2019/057507, Written Opinion dated Apr. 24, 2020", 24 pgs.
"International Application Serial No. PCT/IB2019/057508, International Search Report dated Nov. 12, 2019", 4 pgs.
"International Application Serial No. PCT/IB2019/057508, Written Opinion dated Nov. 12, 2019", 10 pgs.
"Taiwanese Application Serial No. 108123755, Notice dated Aug. 26, 2020", (w/ English Translation), 6 pgs.
"Taiwanese Application Serial No. 108123755, Office Action dated May 13, 2020", 11 pgs.
"Taiwanese Application Serial No. 108123755, Response filed Aug. 14, 2020 to Office Action dated May 13, 2020", (w/ English Translation), 30 pgs.
"Taiwanese Application Serial No. 108123756, Office Action dated May 25, 2020", 29 pgs.
"Taiwanese Application Serial No. 108123758, Office Action dated Feb. 3, 2021", (w/ English Translation), 8 pgs.
"Taiwanese Application Serial No. 108123758, Office Action dated Jun. 29, 2020", (w/ English Translation), 11 pgs.
"Taiwanese Application Serial No. 108123758, Response filed Sep. 29, 2020 to Office Action dated Jun. 29, 2020", (w/ English Translation), 44 pgs.
Bonne, Ronald Johannes, "U.S. Appl. No. 62/941,123, filed Nov. 27, 2019".
Quint, Van Voorst Vader, et al., "U.S. Appl. No. 16/657,475, filed Oct. 18, 2019".
Song, Zhi Hua, et al., "U.S. Appl. No. 62/938,479, filed Nov. 21, 2019".
Song, Zhi Hua, "U.S. Appl. No. 62/938,527, filed Nov. 21, 2019".
Song, Zhi Hua, et al., "Adaptive Pulse Width Modulation With Phase Shift for Micro-Light-Emitting Diode", U.S. Appl. No. 62/951,199, filed Dec. 20, 2019, 47 pgs.
Toni, Lopez, "U.S. Appl. No. 62/890,853, filed Aug. 23, 2019".
Zhi, Hua, et al., "LED Pulse Width Modulation With Active Turn-Off", U.S. Appl. No. 62/888,246, filed Aug. 16, 2019, 16 pgs.
"International Application Serial No. PCT/EP2019/077305, International Preliminary Report on Patentability dated Apr. 29, 2021", 13 pgs.
John, Lawyer, et al., "Thermal Simulations of Packaged IR LED Arrays", Proceedings of SPIE, vol. 6942—Technologies for Synthetic Environments: Hardware-in-the-Loop Testing XIII, edited by Murrer, Jr., R. L., (Apr. 3, 2008), 13 pgs.
"Taiwanese Application Serial No. 108133762, Office Action dated Apr. 13, 2023", w/ English Translation, 14 pgs.

* cited by examiner

METHOD OF DRIVING AN EMITTER ARRAY

CLAIM OF PRIORITY

This application is a continuation of U.S. application Ser. No. 16/657,475, filed Oct. 18, 2019, which claims the benefit of priority to European Application Serial Number 18201408.4, filed Oct. 19, 2018, which are hereby incorporated by reference in their entireties.

FIELD OF INVENTION

The invention describes a method of driving an emitter array, and also describes an LED arrangement.

BACKGROUND

Arrays of very small non-encapsulated light-emitting diodes can be used for various applications such as camera flash or automotive lighting applications. Such non-encapsulated light-emitting diodes are generally referred to as direct emitters. One or more layers of wavelength-converting phosphor may be used to obtain a desired output wavelength desired range. To deliver the desired brightness, uniformity, colour temperature, colour over angle, etc. in such applications, the emitters of an array must be driven with high relative current densities during short pulses. The small emitter size means that relatively high current densities, junction temperatures and phosphor temperatures will be reached during a pulse. It is known that high temperatures have an adverse effect on diode performance. The extent to which emitter temperature affects its light output depends on factors such as the system thermal design, the type of phosphor used, the emitter's hot-cold factor, etc. Various approaches have been suggested to compensate for the effects of temperature, but these solutions usually address the specific problem of how to ensure that a uniform white light can be produced using a combination of red, green and blue emitted diodes, since the different colour LEDs respond differently to temperature fluctuations. The prior art documents US2010259182A1, US2010301777A1, US20060237636A1 and US20120306370A1 consider various ways of ensuring a homogenous light output using different coloured LEDs.

An emitter array of high-power direct emitters may be used to illuminate a scene, for example an automotive front lighting application, a camera flash module, etc. The effect of temperature on the performance of the emitters can result in undesirable changes in illumination and colour shift. This can be particularly noticeable for a camera flash module, for example when the image sensor is used in conjunction with a rolling shutter technique. The effect can also be noticeable in the case of a colour-tuneable flash, because the colour and intensity of the different emitters will react differently to temperature.

Therefore, it is an object of the invention to provide away of driving an array of emitters to overcome the problems outlined above.

SUMMARY

The object of the invention is achieved by the method of claim 1 of driving an array of emitters; and by the LED arrangement of claim 10.

According to the invention, the method of driving an emitter array comprises at least the steps of determining a thermal environment profile for the emitter array; computing a current pulse profile for an emitter on the basis of the thermal environment profile; and applying a current pulse with the computed current pulse profile to that emitter.

Generally, a current pulse profile for an emitter is computed primarily on the basis of a required light output parameter, i.e. the colour and/or the required light intensity of that emitter, the desired brightness, uniformity, colour temperature, colour over angle, etc. The inventive method augments this requirement by information relating to the thermal environment affecting each emitter of the emitter array.

The invention is based on the insight that the performance of an emitter in response to a current pulse is not only determined by the amplitude of the current pulse, but also by the overall thermal environment affecting that emitter. The expression "thermal environment profile" as used in the context of the invention is to be understood as the collective thermal influences acting on each emitter of the emitter array—for example the changing temperature of an emitter (following a preceding current pulse that was applied to that emitter and/or to a neighbouring emitter) as well as the changing temperature of any neighbouring emitters.

When a current pulse is applied to an emitter, the emitter is heated to some extent. Whereas a current pulse may be assumed generally to be very brief, the resulting "thermal pulse" is longer and decays relatively slowly. The thermal effect on an emitter is therefore of a longer duration than the current pulse that caused it. Since flux (change in light output over time) and colour temperature of an emitter are also temperature-dependent, the inventive method allows these emitter properties to be managed in a controlled manner. The thermal environment profile may be assumed to be constantly changing until such time as all the emitters have the same temperature, for example the ambient temperature. The thermal environment profile quantifies the continually changing temperature development over the entire emitter array. At any point following a number of current pulses applied to one or more emitters, the thermal environment profile might be visualized as a 3D array of temperature regions corresponding to the array of emitters, so that the height and orientation of a peak region represents the temperature distribution over the corresponding emitter. Similarly, the shape of a region and the slopes of its sides may describe the temperature distribution over the corresponding emitter. A uniform and essentially unchanging thermal environment profile of an emitter array may be regarded as a steady state thermal environment profile.

An advantage of the inventive method is that the shape of a current pulse applied to an emitter will complement the effects of the thermal environment acting on that emitter array at that instant. In other words, the current pulse applied to an emitter will have been computed to take into account any negative effects arising from the temperature of that emitter as well as the temperatures of its surrounding emitters, as well as to take into account the required light output, the desired on-scene colour temperature, etc. For these reasons, the inventive method may be regarded as an adaptive driving scheme.

According to the invention, the LED arrangement comprises an array of emitters; a thermal environment module realised to determine a thermal environment profile of the emitter array; a current profile computation module realised to compute a current pulse profile for an emitter of the emitter array on the basis of the thermal environment profile; and a driver realised to apply a computed current pulse profile to the corresponding emitter. The current profile computation module preferably also takes into consideration any emitter characteristics that are a function of temperature, for example light output (flux), colour temperature, etc.

The inventive LED arrangement can ensure that an emitter array always delivers a desired light output pattern, for example a homogenous or uniform light output pattern, even if the emitters of an array are unevenly heated. This improved performance can be achieved with relatively little effort and without any significant alterations in circuit design, so that the inventive LED arrangement can be manufactured at favourably low cost.

The dependent claims and the following description disclose particularly advantageous embodiments and features of the invention. Features of the embodiments may be combined as appropriate. Features described in the context of one claim category can apply equally to another claim category.

In the following, without restricting the invention in any way, it may be assumed that an emitter of the array is very small, for example a very small non-encapsulated light-emitting diode (a direct-emitting LED), a vertical-cavity surface-emitting laser (VCSEL) diode, etc. A direct-emitting LED may be realised to emit white light, or may be realised as an infrared-emitting LED (IR-LED). Preferably, an emitter is realised as a sub-500 micron LED, i.e. with a light-emitting area of at most 0.25 mm2. As will be known to the skilled person, such an emitter can be covered in a wavelength converting material such as a phosphor, and may be protected from the environment by a transparent protective coating such as silicone, and is not manufactured to include any optic element. Instead, light-shaping optics can be included as part of the device in which the LED will later be mounted.

Preferably, the emitters are arranged very closely together in an emitter array. The emitters of the emitter array may be realised as individual dies that are mounted very close together onto a common substrate. Alternatively, the emitter array may be realised as a monolithic die with a closely packed array of emitters. In a monolithic die, the emitters can all be fabricated in a single process using the same materials and having the same layer structure and therefore also essentially identical colour points.

The emitter array in an embodiment of the inventive arrangement can comprise any number of emitters arranged in an array, for example nine emitters arranged in a three-by-three array. Essentially, there is no limit to the size of such an emitter array, so that even very large arrays in the order of 100×100 emitters or more are possible, for example in a micro-LED display.

In a preferred embodiment of the invention, the LED arrangement is realised as a camera flash module. In such a realisation, the emitter array preferably comprises at least one cool white emitter and at least one warm white emitter so that the colour point of the light can be tuned as required to optimally illuminate a scene. The current/temperature behaviour of a warm white emitter is usually different than the current/temperature behaviour of a cold white emitter. The inventive method or adaptive driving scheme can provide a solution to the problem of how to prevent a pre-flash from affecting image quality. A pre-flash event is a low-current flash that precedes the actual high-current flash using during image capture. The pre-flash event is used to set up the camera, but it can also affect the image quality because the emitters have been heated immediately prior to the high-current flash.

In another preferred embodiment of the invention, the LED arrangement is realised as an automotive lighting module, for example for daytime running lights (DRL), indicator lights, etc. The LED arrangement can also be realised in a face recognition module. In such an embodiment, the inventive method can be particularly advantageous, since the light output of infrared emitters used in face recognition applications are very temperature dependent.

As explained above, the thermal environment profile takes into account the collective thermal influences affecting each emitter of the emitter array. Initially, before any current pulse has been applied to an emitter, a thermal environment profile may be considered to be in a "null" state or steady state, since all emitters will have the same temperature (e.g. the ambient temperature). An initial state of the thermal environment profile may be obtained by measuring the forward voltages of the emitters and using this information to estimate the temperatures of the individual emitters. Alternatively, the emitter temperatures could be measured using a suitable arrangement of negative temperature coefficient resistors, infrared sensors, etc.

As soon as one or more emitters have been turned on by a current pulse, the thermal environment profile will be in a state of flux until such time as a steady-state temperature distribution is reached. In an emitter array that is operated for a relatively long time, for example in a DRL application, a steady state temperature distribution may be reached after the first few current pulses. In the case of a pulsed application such as a camera flash, a steady-state temperature distribution will generally only be reached some time after the last flash event, i.e. the temperature distribution will slowly decay to the uniform ambient temperature when all emitters are "off".

There are various ways of establishing a thermal environment profile to comprise information relating to temperature development in the emitters and to describe the temperature development of each emitter. For example, a direct feedback approach may be used, based on continually sampling the forward voltages of the emitters to estimate the emitter temperatures. Such an approach may use a look-up table or calibration table to relate forward voltages to emitter temperatures. An alternative approach can make use of the near-linear relationship between forward voltage and junction temperature.

In a particularly preferred embodiment of the invention, the thermal environment profile is established using a thermal predictive model, and describes the temperature development of each emitter by a mathematical function. In the inventive method, the thermal predictive model relates emitter power (emitter current×forward voltage) to emitter temperature over time. Using the thermal predictive model, the colour temperature of part of the scene, illuminated by a certain emitter, can be derived as a function of emitter current and time. By inversing the relationship, a current profile can be calculated for that emitter. By doing this for all emitters of the array, a current profile matrix can be established for a subsequent pulse event. Alternatively, it is possible to model the emitter behaviour, by expressing light output as a function of current and temperature.

The invention is based on the insight that the temperature of an emitter behaves in a manner similar to the voltage step response of an RC circuit. The thermal behaviour of an emitter can therefore be described by an appropriate thermal time constant. The thermal time constant of an emitter can be established during the manufacturing process. In one approach, the temperature response of the individual emitters within a certain application can be determined, so that characteristic thermal time constants may be derived for the product or design. For example, the temperature response of the emitters of a certain 10×10 array can be determined, and characteristic thermal time constants are then derived for a camera flash using that type of 10×10 array.

Alternatively or in addition, the thermal time constant of an emitter may be determined numerically. The temperature development of each emitter is therefore described by a corresponding mathematical function. The thermal predictive model may be regarded as the set of mathematical functions used to describe the thermal behaviour of the emitter array. With this information, the thermal environment profile may be visualized at any point in time as a dynamically changing array of peaks, whereby the height of each peak is either increasing (during a current pulse) or decreasing (following a current pulse). The rate of increase/decrease of a peak is determined by the thermal time constant of the corresponding emitter and parameters relating to the product design. Similarly, the shape of a peak may morph towards neighbouring, higher peaks. This is because a hot emitter will heat its neighbouring emitters. This information can be used to predict the future behaviour of the emitters following any current pulse pattern and to determine any corrections that should be undertaken to the current pulses in order to achieve a desired light output pattern from the emitter array. For example, knowing that a particular emitter will have been heated directly by a current pulse and also indirectly from two adjacent emitters, a tailored current pulse profile may be computed for that emitter in order to compensate for the lower performance that would otherwise result because of the emitter's temperature. The thermal predictive model can predict the temperature of each emitter at any time, regardless of whether or not that emitter and/or any of its neighbours have been driven by a current pulse. The inventive method may make use of a full mathematical model by first setting up a generic mathematical model and then making it product-specific by using measured or calculated thermal properties.

Preferably, the thermal environment profile also takes into account the pulse history of each emitter. Depending on the pulse rate used to drive the emitters, it may be that the temperature of an emitter is still "decaying". i.e. decreasing, when a subsequent pulse is applied to that emitter or to one of its neighbours. The residual heat from the previous pulse will have a cumulative effect, so that a greater temperature is reached during the subsequent pulse. Therefore, in a particularly preferred embodiment of the invention, the (recent) pulse history of an emitter is considered when computing the shape of a subsequent current pulse. Relevant information to compute a suitable subsequent current pulse shape may be the thermal time constants of the neighbouring emitters, a thermal time constant of a sub mount or PCB, etc. A suitable model can be used to compute the shape of a subsequent current pulse.

When a phosphor layer is applied to an emitter to perform wavelength conversion, the colour temperature of the emitter can change as a function of the emitter temperature due to spectral blue pump shift and a temperature-related change in phosphor behaviour. In an emitter without a wavelength-converting phosphor layer, an increase in temperature may result in a spectral shift. Therefore, in a preferred embodiment of the invention, the thermal predictive model also considers the temperature dependency of a desired colour point. This can be done by deriving a temperature-dependent behaviour model of the emitters on the basis of measurements, for example. When using warm white and cold white emitters in a single array, the on-scene colour temperature can be kept stable by adjusting the warm-white/cold-white flux ratio during the pulse.

The current pulse profiles for the emitters can be computed to adjust the ratio of a light output parameter of a first emitter to the corresponding light output parameter of a second emitter. A light output parameter can be any of brightness, colour temperature, etc. This can be advantageous in a colour-tuneable LED arrangement in which the emitter array comprises at least two LEDs having different colours. For example an LED flash module can use an emitter array that has at least one cold white emitter and one warm white emitter, each with phosphor layers for wavelength conversion. Because an emitter heats up very rapidly following the start of a current pulse, and because the phosphor behaviour is temperature-dependent, any difference in colour may be most pronounced at the start of a pulse event. In a preferred embodiment of the invention, therefore, the current pulse profiles for the emitters are computed to dynamically adjust the ratio of the first emitter colour to the second emitter colour during a current pulse. In this way, with relatively little effort, the ratio of warm white to cool white can be adjusted even during a pulse in order to achieve a uniform flash colour temperature distribution.

Other objects and features of the present invention will become apparent from the following detailed descriptions considered in conjunction with the accompanying drawings. It is to be understood, however, that the drawings are designed solely for the purposes of illustration and not as a definition of the limits of the invention.

BRIEF DESCRIPTION OF THE DRAWINGS

In the drawings, like numbers refer to like objects throughout. Objects in the diagrams are not necessarily drawn to scale.

DETAILED DESCRIPTION OF THE PREFERRED EMBODIMENT(S)

Figure 1:
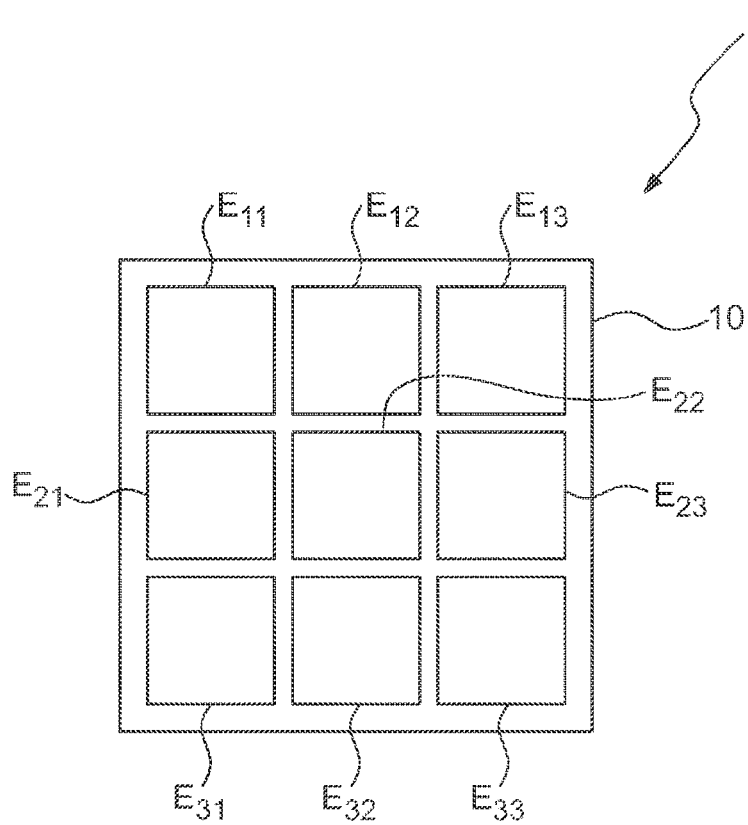
FIG. 1 shows an array of direct-emitting LEDs.

FIG. 1 shows an emitter array 1 with a square arrangement of nine emitters $E_{11}, E_{12}, \ldots, E_{33}$ for use in a camera flash application, for example a flash module of a mobile phone. In this exemplary embodiment, the emitters $E_{11}, E_{12}, \ldots, E_{33}$ are sub-500 micron dies, i.e. the surface area of each emitter is at most 0.25 mm². The dies are closely packed and mounted on a common carrier 10 or PCB. The gap between any two adjacent emitters may comprise about 100 μm or less. Alternatively, the emitter array 1 could be realised as a monolithic die. The emitters $E_{11}, E_{12}, \ldots, E_{38}$ are driven individually by a driver module (not shown in the diagram) comprising a driver that issues current pulses for the emitters according to a control algorithm. In the following, graphs of current, temperature and relative light output are shown in a similar 3×3 array layout so that information content of a graph can easily be related to the corresponding emitter.

Figure 2:
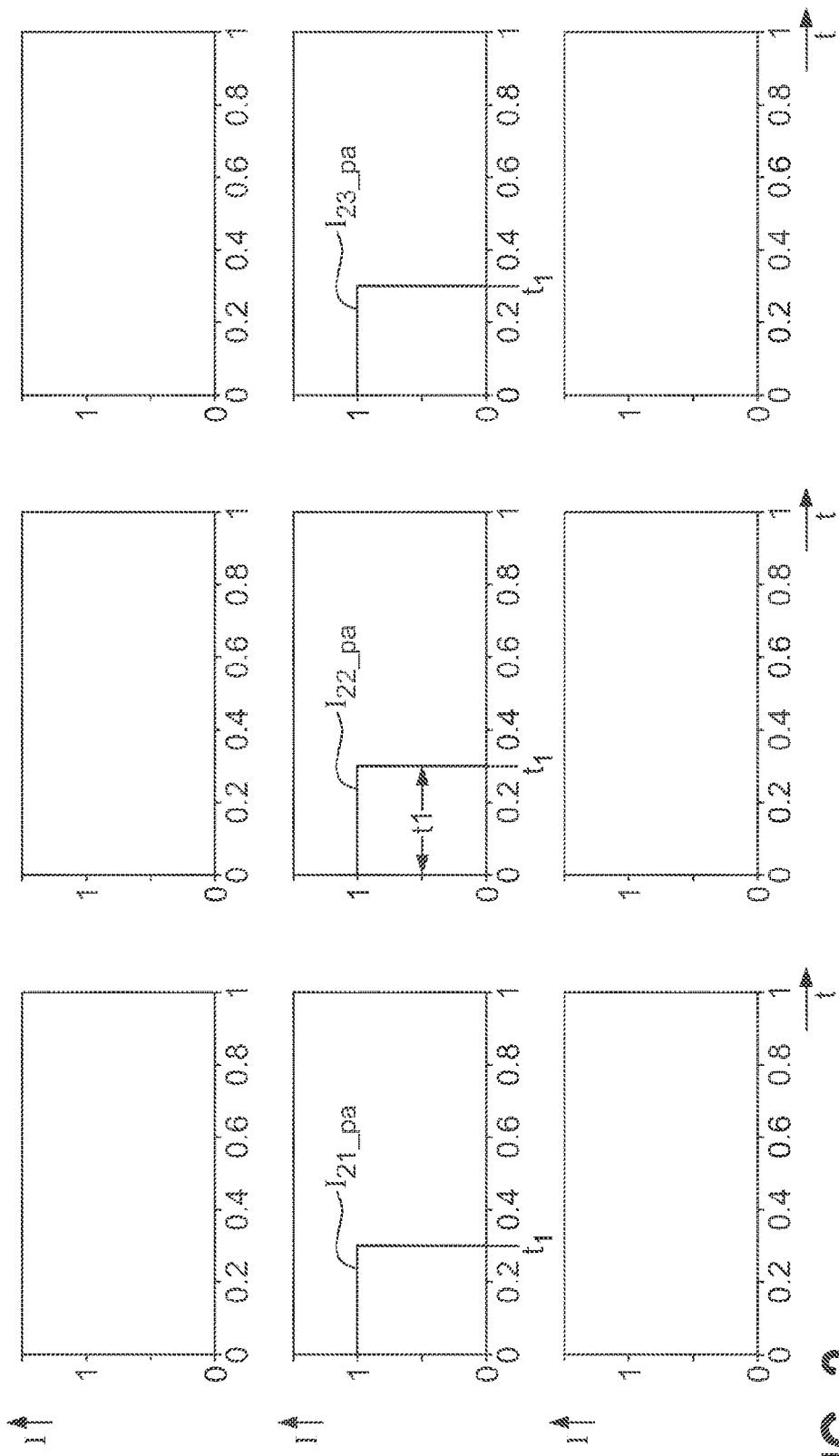
FIG. 2 shows rectangular current pulses to drive three emitters of the array of FIG. 1 using a prior art approach.
Figure 3:
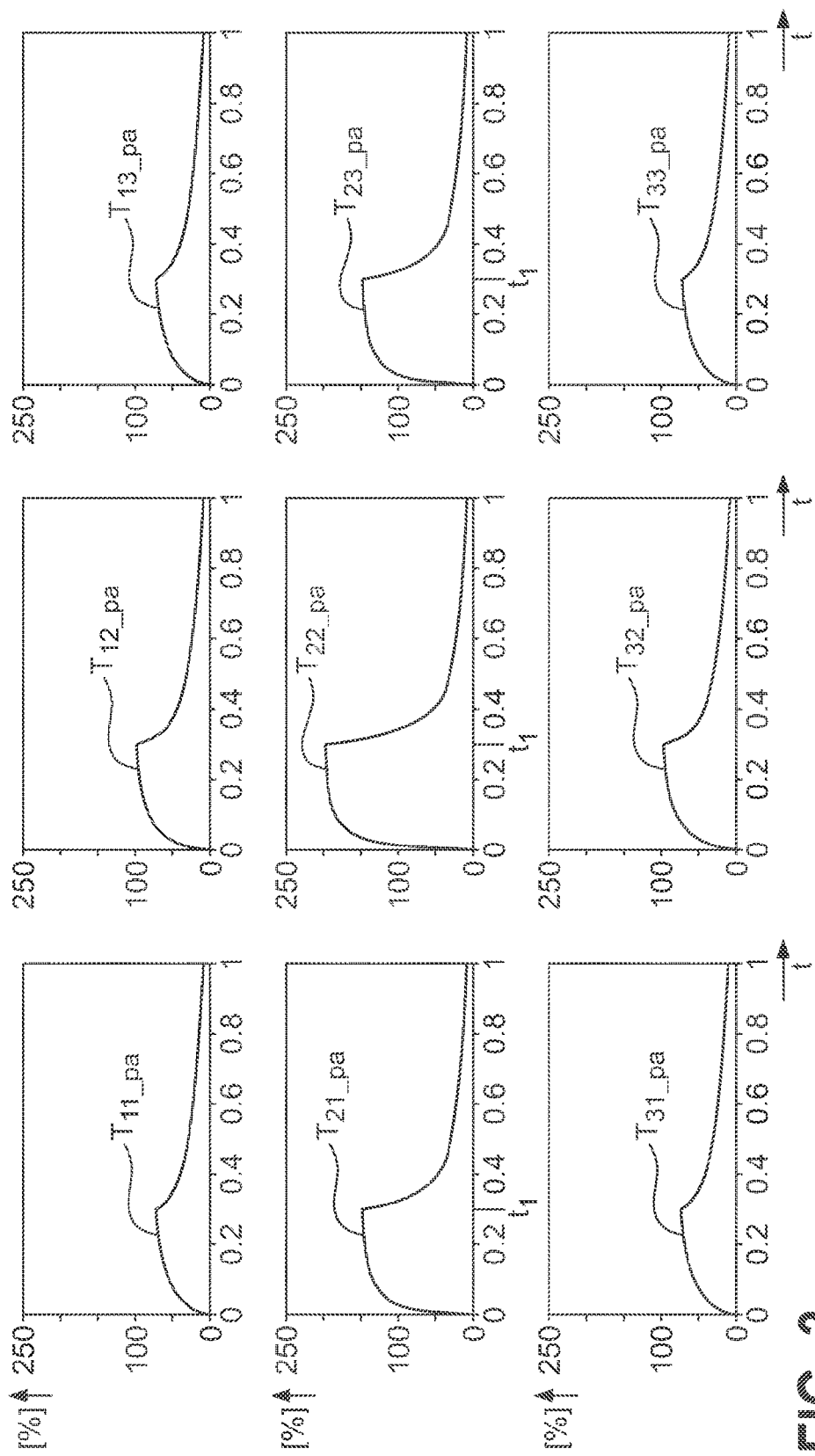
FIG. 3 shows thermal response of the nine emitters of the array of FIG. 1 using a prior art approach.

In the prior art, the driver is realised to drive selected emitters $E_{11}, E_{12}, \ldots, E_{33}$ with identical current pulses. FIG. 2 shows three rectangular current pulses $I_{21\_pa}, I_{22\_pa}, I_{23\_pa}$ in a time interval t1 extending from time 0 to time $t_1$ to drive the three emitters $E_{21}, E_{22}, E_{23}$ of the middle row using the prior art approach. The graphs indicate relative current (Y-axis) against time (X-axis). The emitters $E_{11}, E_{12}, E_{13}, E_{31}, E_{32}, E_{33}$ of the top and bottom rows are to remain off. The three emitters $E_{21}, E_{22}, E_{23}$ of the middle row will heat up as a result of their respective current pulses $I_{21\_pa}, I_{22\_pa}, I_{23\_pa}$, but each of these emitters will also heat its neighbours. The temperature development during and after the current pulses is shown in FIG. 3, which indicates relative temperature (Y-axis, in percent) against time (X-axis). Because a hot emitter heats its neighbours, the temperature $T_{22\_pa}$ of the central emitter $E_{22}$ will rise to the greatest level. The temperatures $T_{21\_pa}, T_{23\_pa}$ of the two outer emitters $E_{21}, E_{23}$ of the middle row will also be influenced by the central emitter $E_{22}$, and the emitters $E_{11}, E_{12}, E_{13}, E_{31}, E_{32}, E_{33}$ of the top and bottom rows—even though they were not turned on—will become heated by the middle row of emitters $E_{21}, E_{22}, E_{23}$. The central emitter $E_{22}$ is heated by both adjacent emitters $E_{21}, E_{23}$, and because the central emitter $E_{22}$ is hottest, the middle emitters $E_{12}, E_{32}$ of the top and bottom rows are also heated more than the outermost four emitters $E_{11}, E_{13}, E_{31}, E_{33}$.

Figure 4:
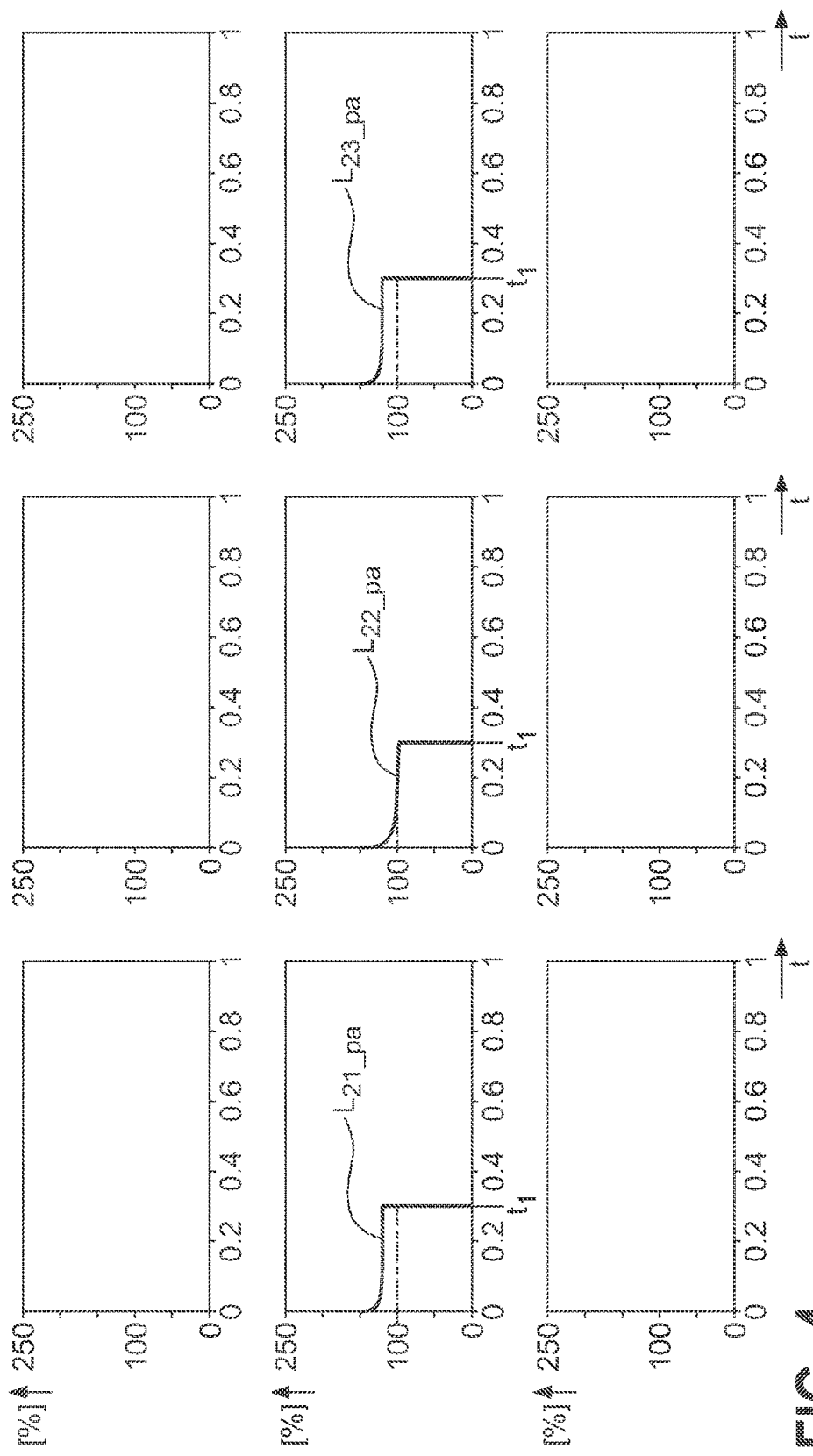
FIG. 4 shows light output of the three driven emitters of the array of FIG. 1 using a prior art approach.

The temperature of an emitter affects the light output by that emitter. FIG. 4 illustrates this effect, and shows the relative light output $L_{21\_pa}, L_{22\_pa}, L_{23\_pa}$ (in percent) by the three emitters $E_{21}, E_{22}, E_{23}$ of the middle row. The diagram shows that the initially high light output decreases rapidly as the emitters $E_{21}, E_{22}, E_{23}$ heat up, and that the relative light output $L_{22\_pa}$ of the central emitter $E_{22}$ decreases to the greatest extent. Regarding this light output level as 100%, the light output of the outer two emitters $E_{21}, E_{23}$ decreases to a lesser extent, to a level above the 100% mark on the Y-axis. This is because the central emitter $E_{22}$ is also heated the most, being flanked by two hot emitters $E_{21}, E_{23}$. Instead of delivering a uniform light output pattern, the three emitters driven using the prior art approach will deliver an uneven light output pattern.

The temperature of an emitter decreases after termination of the current pulses, but may be still significantly higher than an ambient temperature by the end of a second time interval after which a subsequent pulse is to be applied to the emitter array.

In the case of an emitter array that implements a combination of warm-white and cold-white emitters, the different emitter behaviours over temperature result in deviations from the desired on-scene colour temperature.

Figure 5:
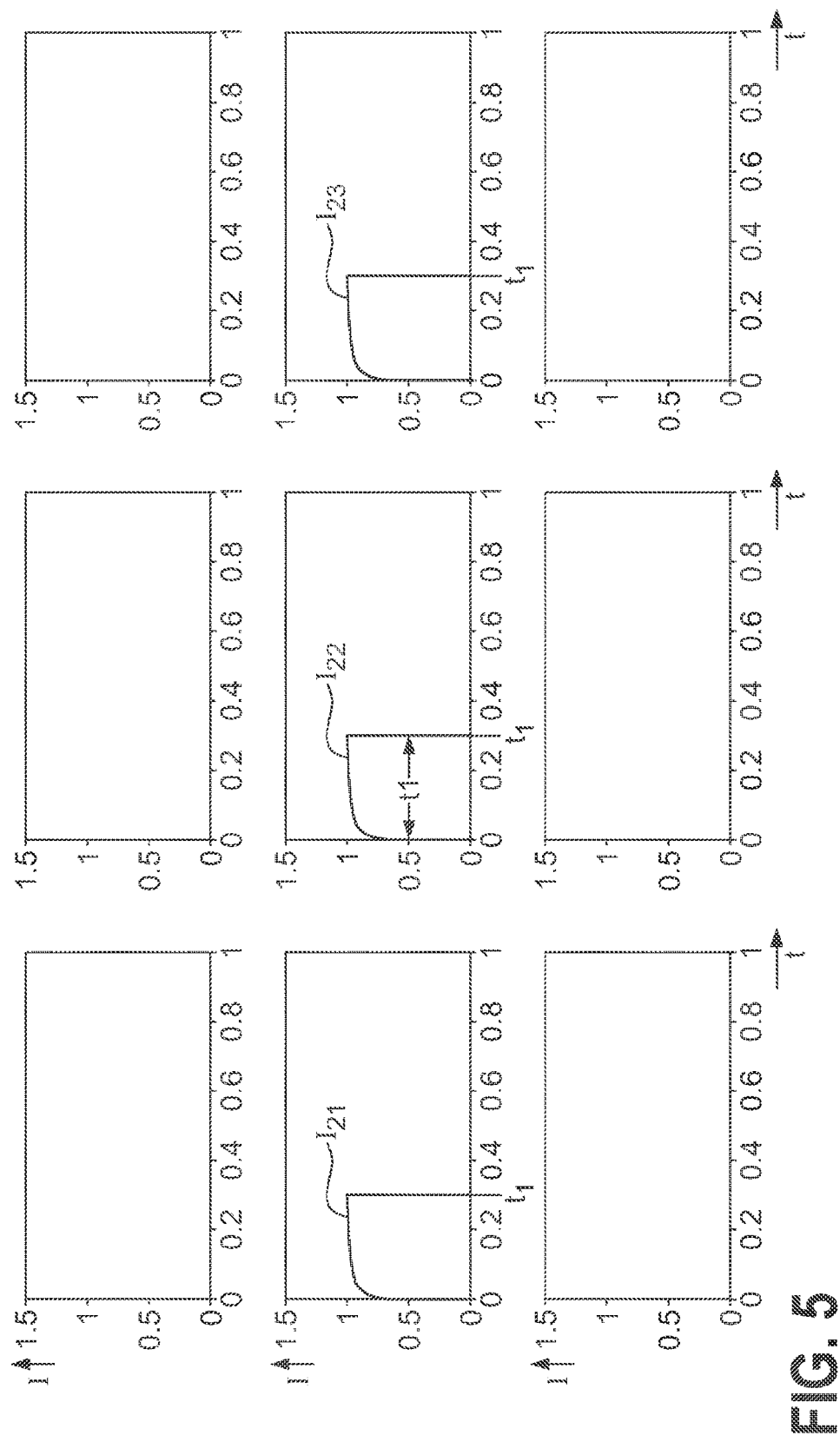
FIG. 5 shows tailored current pulses to drive three emitters of the array of FIG. 1 using the inventive method.
Figure 6:
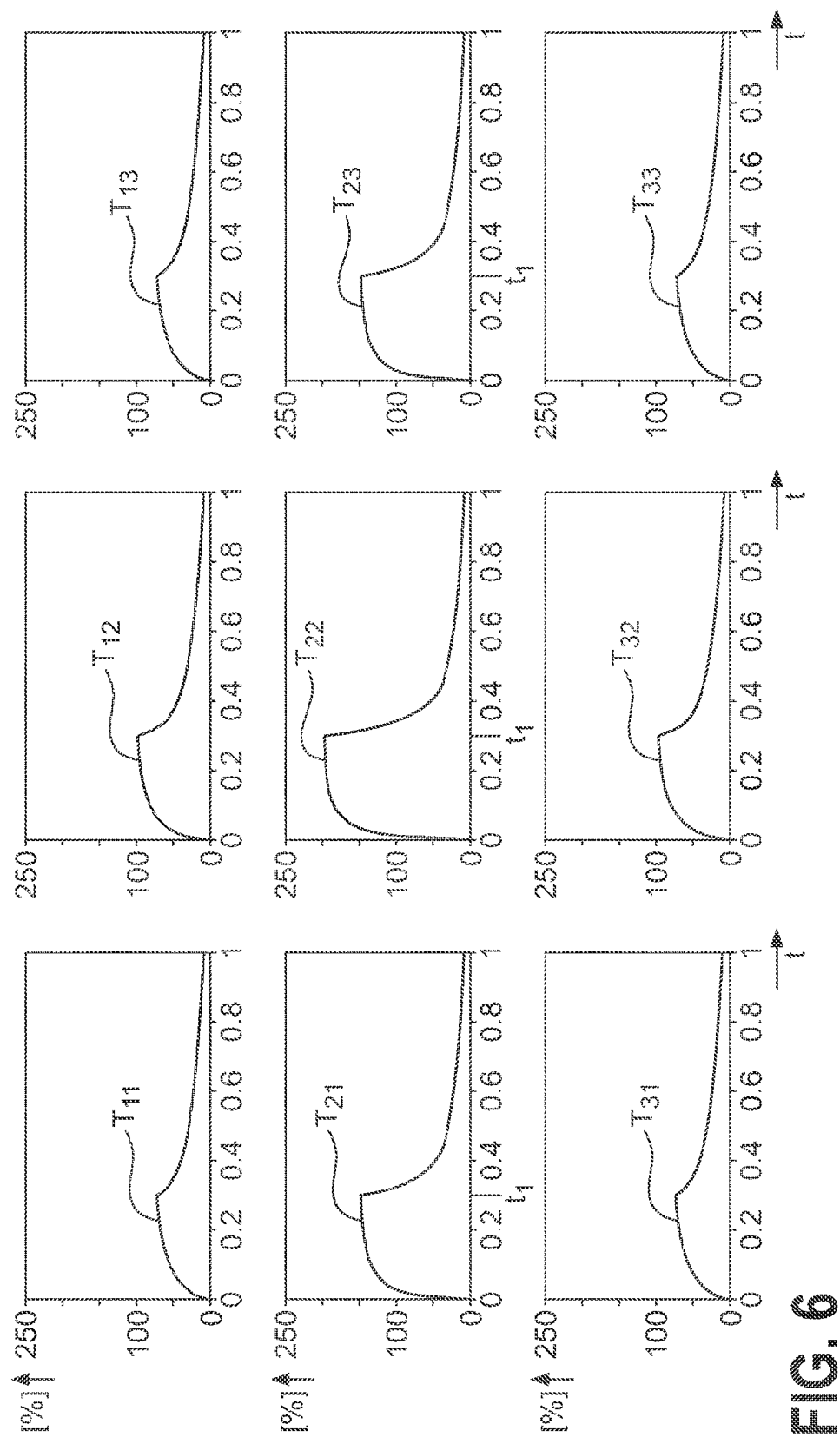
FIG. 6 shows thermal response of the nine emitters of the array of FIG. 1 using the inventive method.
Figure 7:
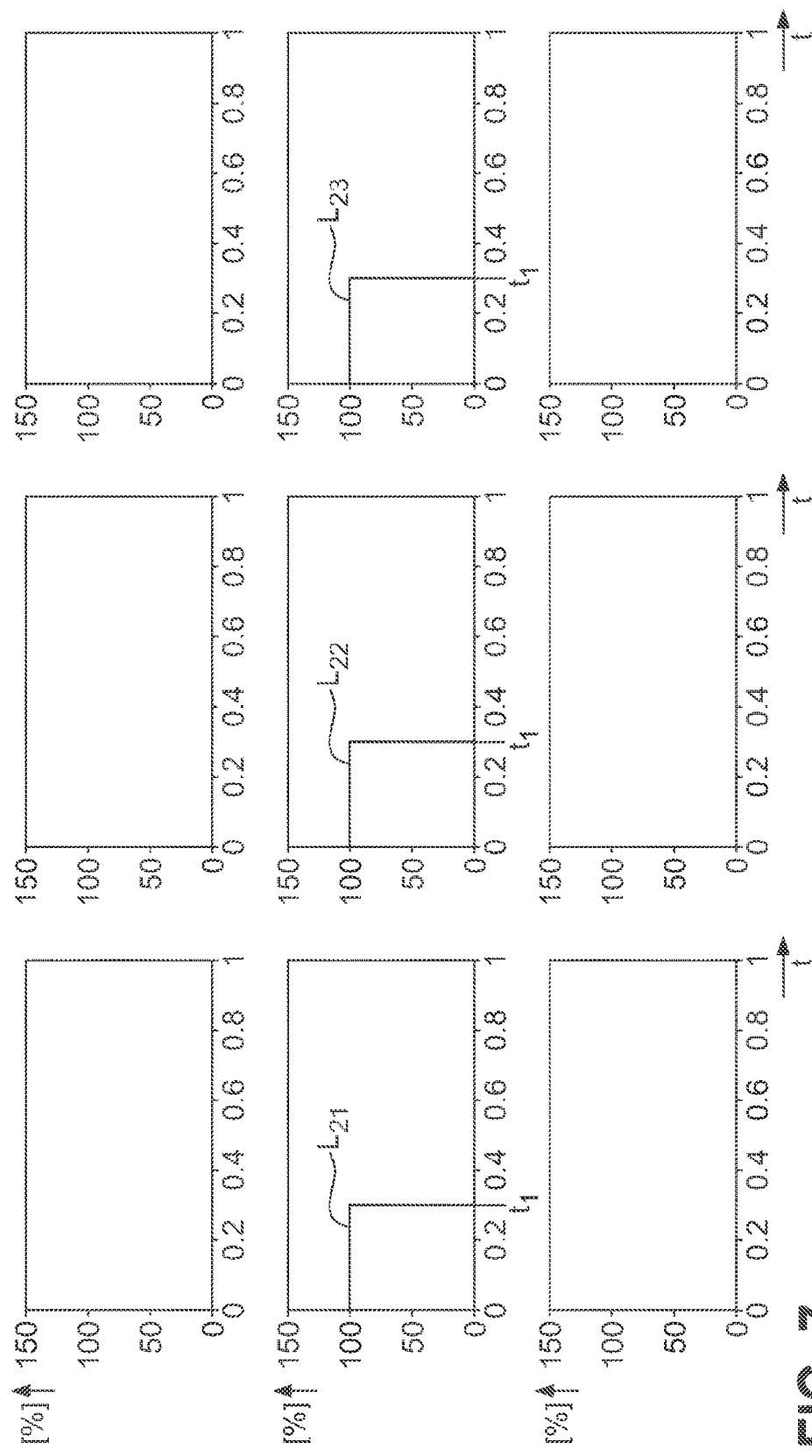
FIG. 7 shows light output of the three driven emitters of the array of FIG. 1 using the inventive method.

The inventive method provides a solution to these problems and is explained with the aid of FIGS. 5-7, using the same 3×3 emitter array of FIG. 1 as a basis. Assuming that the middle row of emitters $E_{21}, E_{22}, E_{23}$ is to be driven, the approach taken by the invention is to predict the temperature environment that will affect the relevant emitters, and to compute the current pulse shapes that will be needed to counteract the negative effects of emitter temperatures. An example of three tailored current pulses $I_{21}, I_{22}, I_{23}$ is shown in FIG. 5. Instead of the simple rectangular shapes shown in FIG. 2, the three current pulses $I_{21}, I_{22}, I_{23}$ applied to the middle row of emitters $E_{21}, E_{22}, E_{23}$ have shapes or profiles that will ensure a uniform light output even though the emitter temperatures will change during the current pulse event over time interval t1 (again, the pulse event starts at time 0 and ends at time $t_1$).

FIG. 6 shows the temperature development in the emitter array following the current pulses $I_{21}, I_{22}, I_{23}$ shown in FIG. 5. The relative temperatures $T_{11}, \ldots, T_{33}$ of the emitters $E_{21}, E_{22}, E_{23}$ are different from those shown in FIG. 3 owing to the different shapes of the current pulses $I_{21}, I_{22}, I_{23}$ applied to the middle emitter row.

FIG. 7 shows the relative light output $L_{21}, L_{22}, L_{23}$ (in percent) of the three emitters $E_{21}, E_{22}, E_{23}$ of the middle row after receiving the current pulses $I_{21}, I_{22}, I_{23}$ shown in FIG. 5. The diagram shows that the initially high light output (close to 100%) is essentially maintained, even as the emitters $E_{21}, E_{22}, E_{23}$ heat up, and that the light output $L_{22}$ of the central emitter $E_{22}$ is essentially no different from the light output $L_{21}, L_{23}$ by the two outer emitters $E_{21}, E_{23}$. Therefore, even thought the central emitter $E_{22}$ is heated by its neighbours, the adjacent emitters $E_{21}, E_{23}$, these three emitters deliver a favourably uniform light output pattern.

Figure 8:
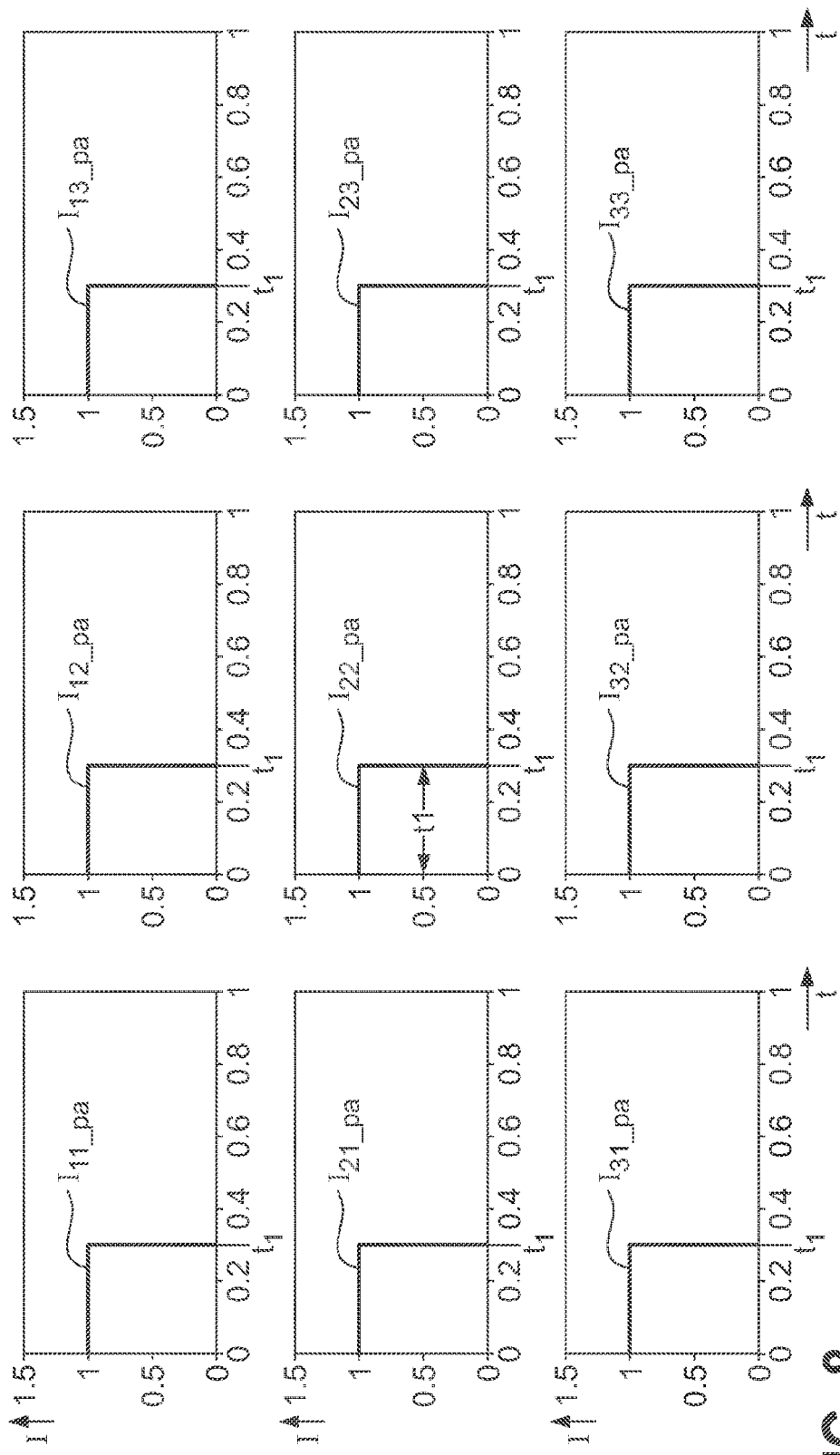
FIG. 8 shows rectangular current pulses to drive nine emitters of the array of FIG. 1 using the prior art approach.
Figure 9:
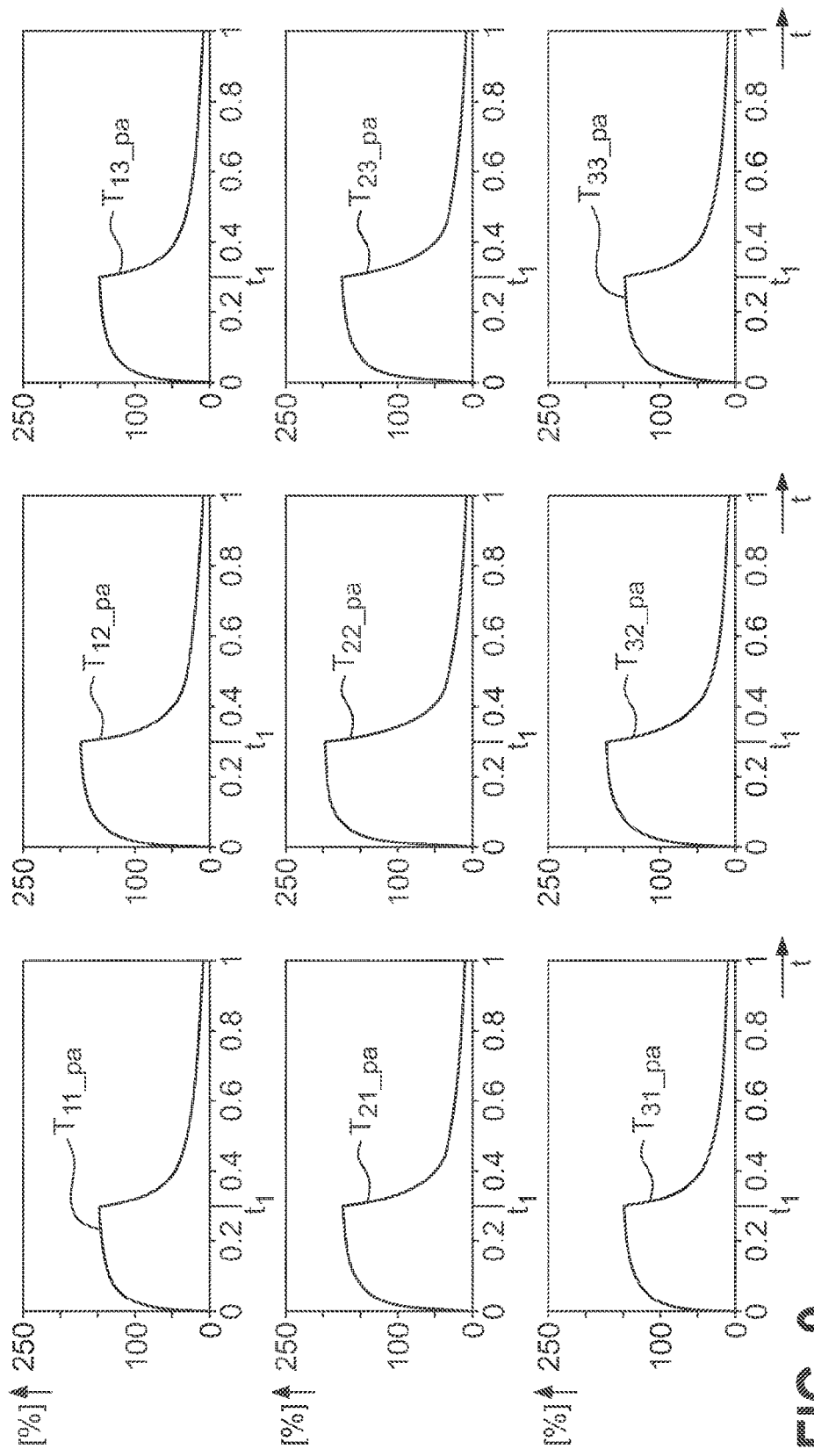
FIG. 9 shows thermal response of the nine emitters of the array of FIG. 1 using the prior art approach.
Figure 10:
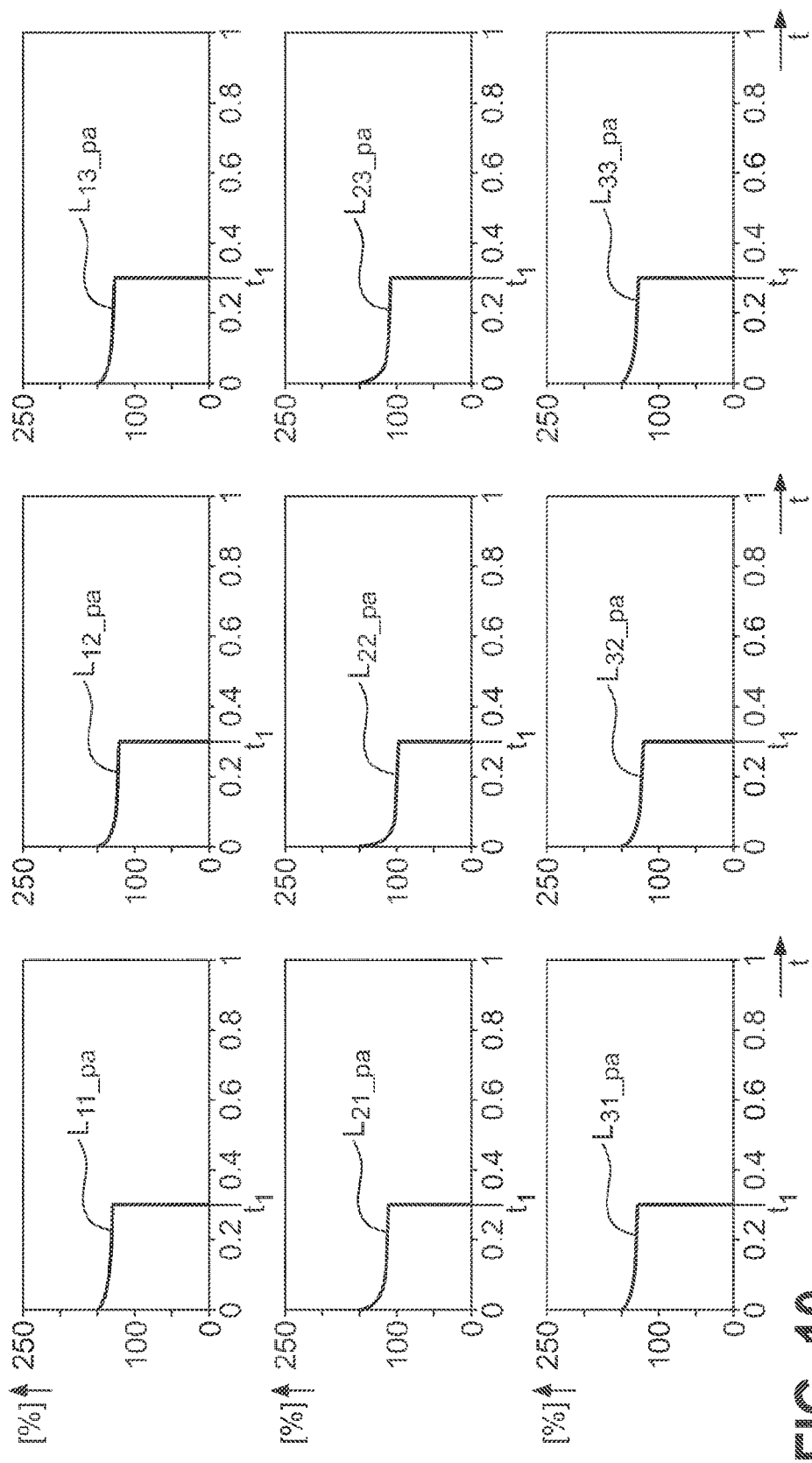
FIG. 10 shows light output of the nine driven emitters of the array of FIG. 1 using the prior art approach.

FIGS. 8-10 respectively show current pulses $I_{11\_pa}, \ldots I_{33\_pa}$, relative temperature development $T_{11\_pa}, \ldots T_{33\_pa}$ and relative light output $L_{11\_pa}, \ldots L_{33\_pa}$ when all nine emitters $E_{11}, \ldots E_{33}$ of the array in FIG. 1 are simultaneously switched using the prior art approach. The drawings show that, in response to nine identical current pulses $I_{11\_pa}, \ldots I_{33\_pa}$, the temperature of the central emitter $E_{22}$ is highest, and lowest at the four outer corner emitters $E_{11}, E_{13}, E_{31}, E_{33}$. As a result, the light output of the array is uneven, with the hotter emitters $E_{12}, E_{21}, E_{22}, E_{23}, E_{32}$ delivering the lowest light output $L_{12\_pa}, L_{21\_pa}, L_{22\_pa}, L_{23\_pa}, L_{32\_pa}$.

Figure 11:
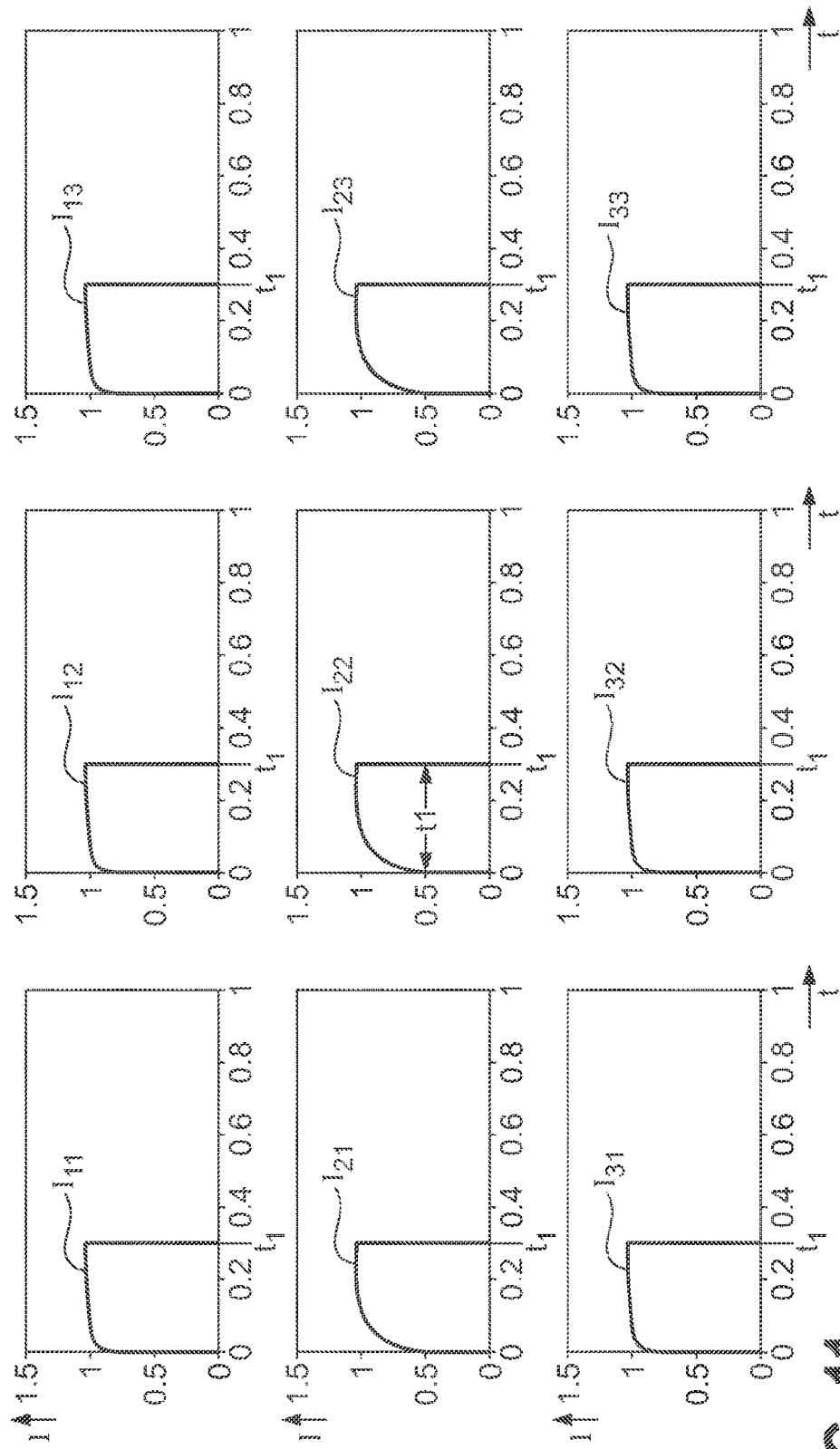
FIG. 11 shows tailored current pulses to drive nine emitters of the array of FIG. 1 using the inventive method.
Figure 12:
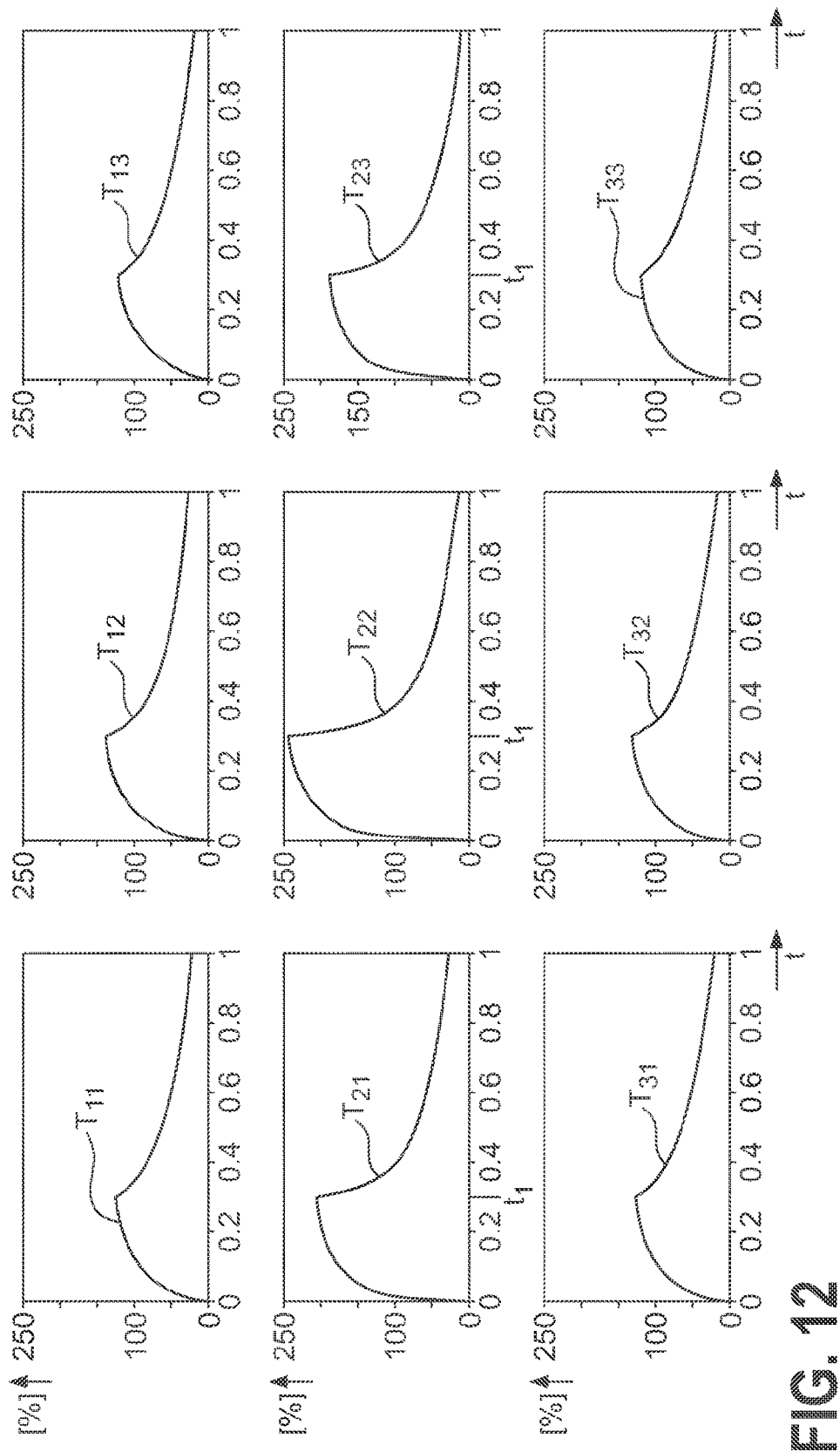
FIG. 12 shows thermal response of the nine emitters of the array of FIG. 1 using the inventive method.
Figure 13:
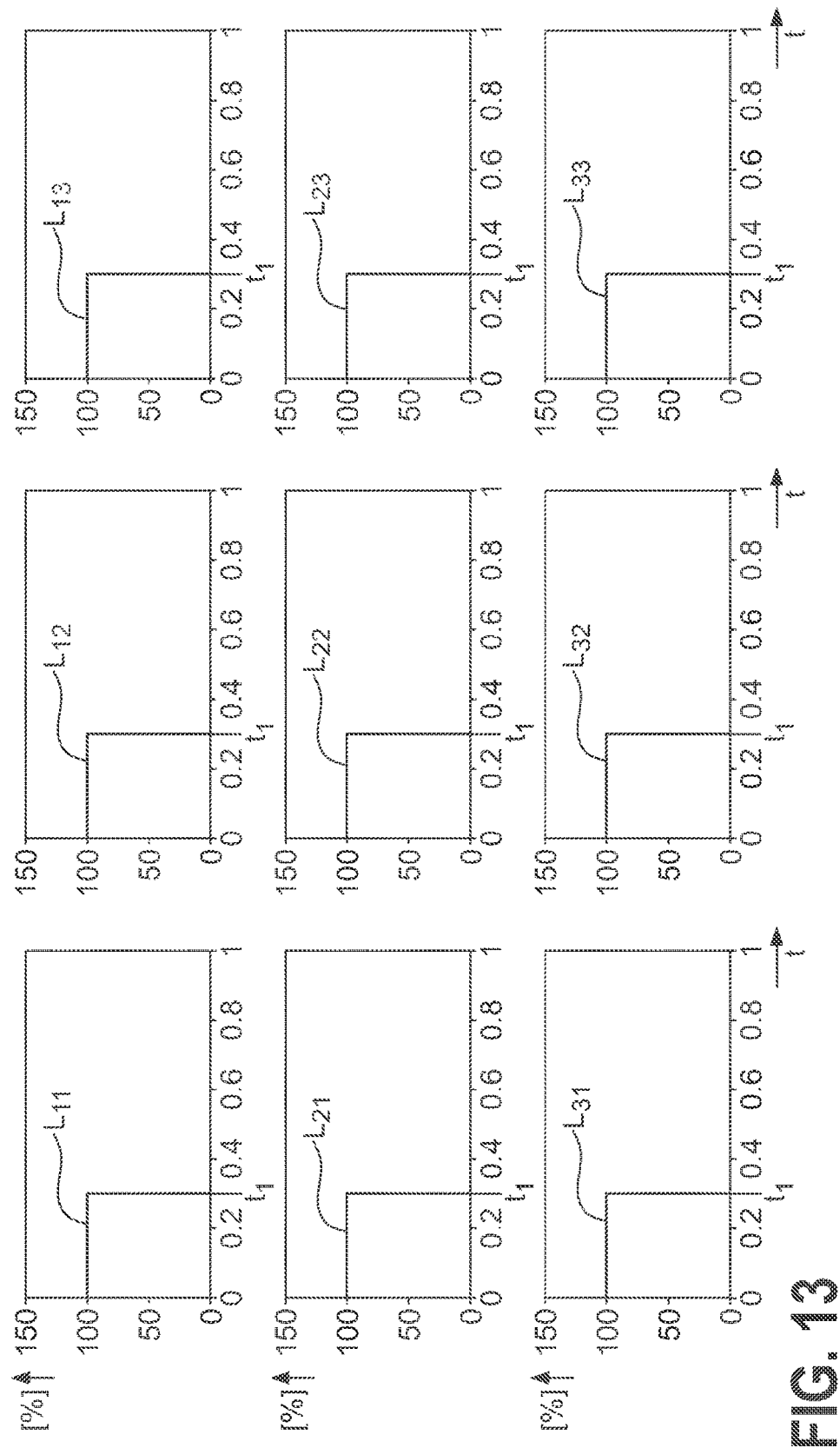
FIG. 13 shows light output of the nine driven emitters of the array of FIG. 1 using the inventive method.

FIGS. 11-13 respectively show current pulses $I_{11}, \ldots I_{33}$, temperature development $T_{11}, \ldots T_{33}$ and light output $L_{11}, \ldots L_{33}$ when all nine emitters $E_{11}, \ldots E_{33}$ of the array in FIG. 1 are simultaneously switched using the inventive method. The drawings show that, in response to nine tailored current pulses $I_{11}, \ldots I_{33}$, the light output of the array is even or homogenous, with all emitters $E_{11}, \ldots E_{33}$ delivering essentially the same light output levels $L_{11}, \ldots L_{33}$, even though the "inner" emitters are heated by their neighbours. By taking these heating effects into account when computing the current shapes, a favourable homogenous light output is obtained.

As explained above, the pulse history of an emitter will determine its behaviour during a subsequent pulse, i.e. any preceding pulse may affect the behaviour of an emitter if the preceding pulse was applied to that emitter or to a neighbouring emitter, and if the temperature of any of those emitters is still greater than its steady state or ambient value.

Figure 14:
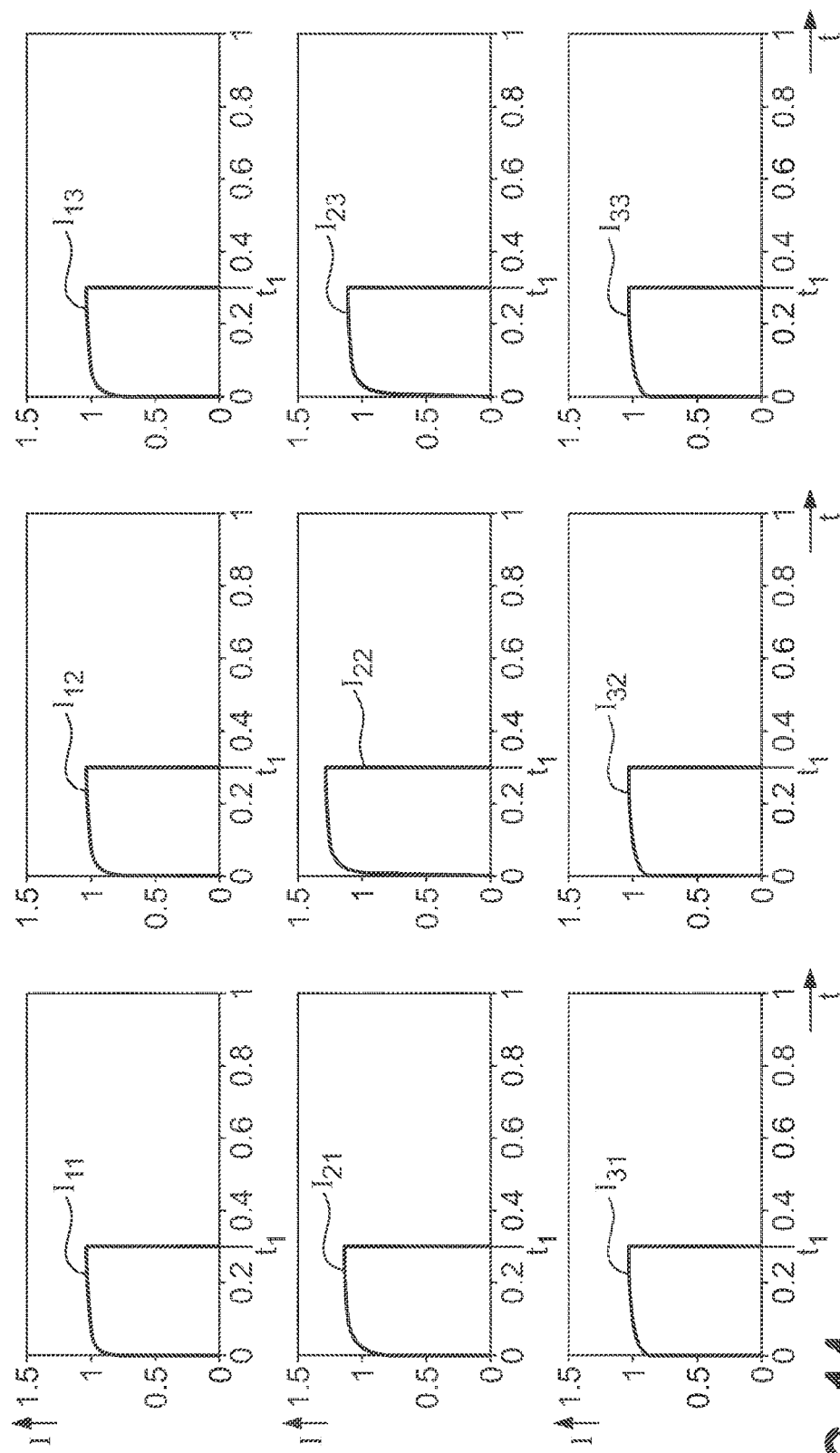
FIG. 14 shows tailored subsequent current pulses to drive nine emitters of the array after a preceding switching event of the array of FIG. 1 using the inventive method.

FIG. 14 shows how the inventive method can take pulse history into consideration when all nine emitters $E_{11}$, $E_{12}, \ldots, E_{33}$ are to be driven in a pulse event following the pulse event of FIG. 11. The current profile computation module takes into consideration the temperature of each emitter $E_{11}, E_{12}, \ldots, E_{33}$ prior to the intended pulse event interval, as shown in FIG. 12, and computes the necessary current profile shapes accordingly. A set of nine such tailored current pulses $I_{11}, I_{12}, \ldots, I_{33}$ is shown in FIG. 14. The relative light output $L_{11}, L_{12}, \ldots L_{33}$ of the entire emitter array is shown will be the same as in FIG. 13, i.e. all nine emitters deliver the same light output so that the emitter array delivers a favourably uniform light output even though the emitters had different temperatures prior to the second pulse event of FIG. 14.

Figure 15:
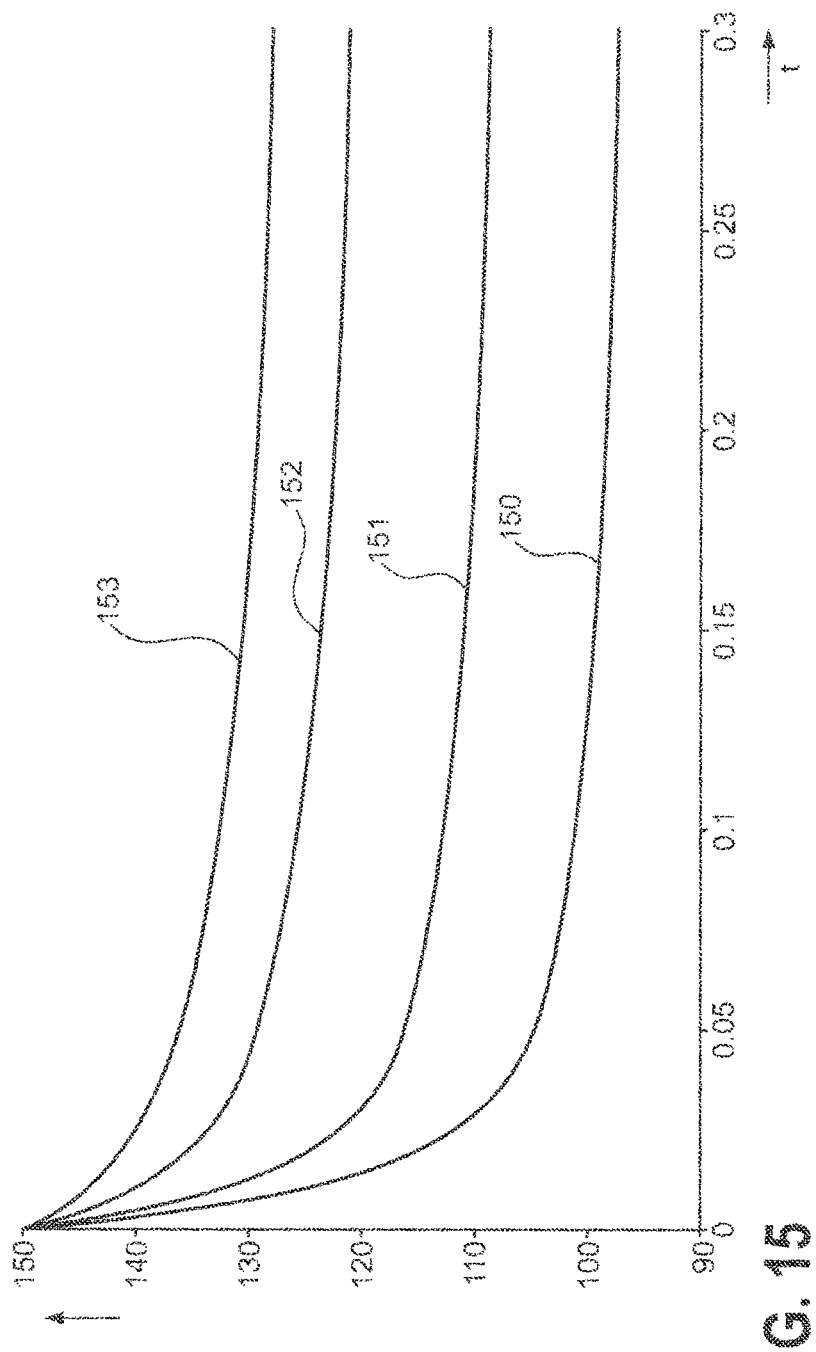
FIG. 15 shows light output as a function of emitter position in the matrix of FIG. 1 when driven using a prior art approach.

FIG. 15 shows light output as a function of emitter position in an array, for example in the 3×3 matrix of FIG. 1, when current pulses do not take thermal crosstalk into consideration. The diagram shows light output curves, each decreasing to different levels. Curve 150 corresponds to an emitter heated by four surrounding emitters, for example the central emitter $E_{22}$ in the matrix of FIG. 1. Curve 151 corresponds to an emitter heated by three surrounding emitters, for example emitters $E_{12}, E_{21}, E_{23}, E_{32}$ in the middle of each side of the array in the matrix of FIG. 1. Curve 152 corresponds to an emitter heated by two surrounding emitters, for example emitter $E_{11}, E_{13}, E_{31}, E_{33}$ at an outer corner of the array in the matrix of FIG. 1. Curve 153 corresponds to an emitter that is not heated by any surrounding emitter.

Figure 16:
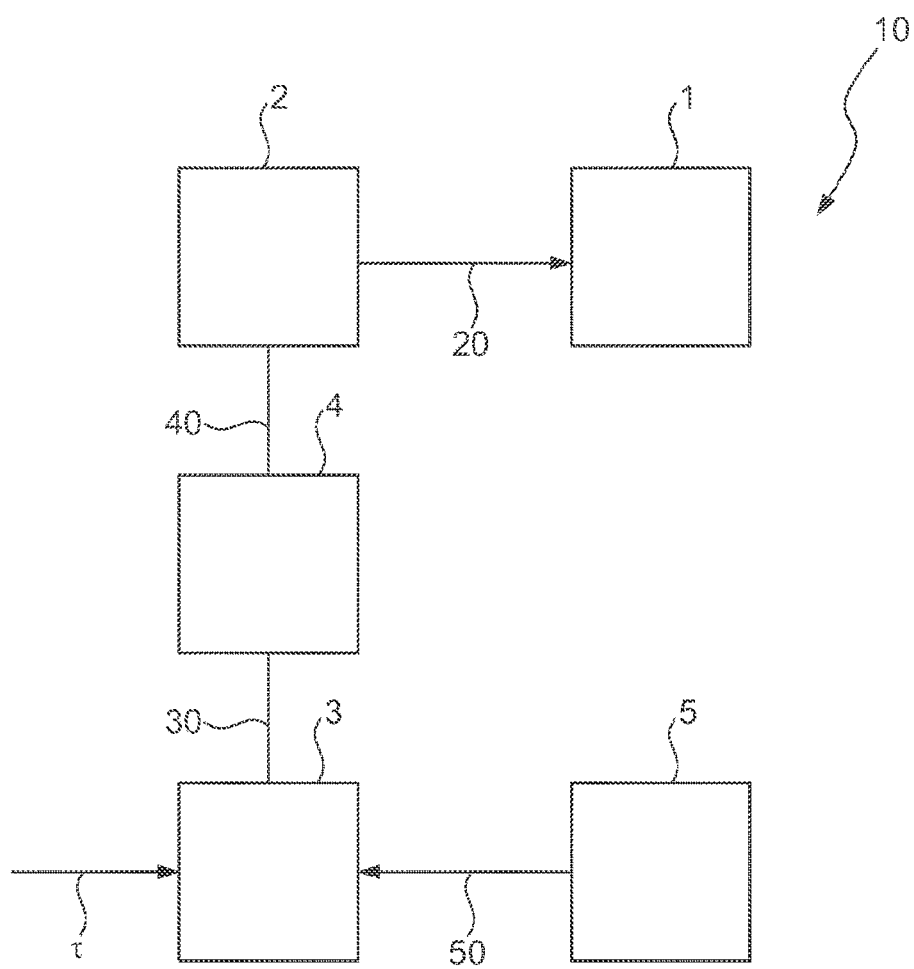
FIG. 16 shows an embodiment of the inventive LED arrangement.

FIG. 16 shows an embodiment of the inventive LED arrangement 10, showing an emitter array 1 and a driver 2. The driver 2 is configured to apply individual tailored current pulses 20 to the emitters as explained in FIGS. 5, 11 and 14. The driver 2 can be connected via a suitable bus to deliver the current pulses 20 to the emitters of the array 1. For a 2×2 array, the driver 2 will be realised to generate four current pulses 20; for a 3×3 array, the driver 2 will be realised to generate nine current pulses 20, etc. In this exemplary embodiment, a thermal environment module 3 applies a suitable model that is given the thermal time constants τ of the emitters, and which predicts emitter temperature behaviour following a current pulse. In this embodiment, the thermal environment module 3 uses one thermal time constant for each emitter, for example. The thermal time constants τ may be stored in a memory. The thermal environment module 3 provides a current profile computation module 4 with information 30 necessary to determine the current pulse profiles 40 of the tailored current pulses 20 that will be required to achieve a desired light output pattern. Such information can comprise input temperature data, output current shape data, etc. Here also, the current profile computation module will be realised to generate four current pulse profiles 40 for a 2×2 array, nine current pulse profiles 40 for a 3×3 array, etc.

A further circuit may be used to obtain information about the actual temperature of the emitters. For example, an initial condition for the thermal environment profile can be established by measuring the forward voltages of the emitters and estimating the actual temperatures. To this end, this embodiment of the inventive LED arrangement 10 also comprises a forward voltage measuring module 5, and the measured forward voltages 50 can be passed to the thermal environment module 3 which uses them to predict the temperature behaviour of the emitters.

Figure 17:
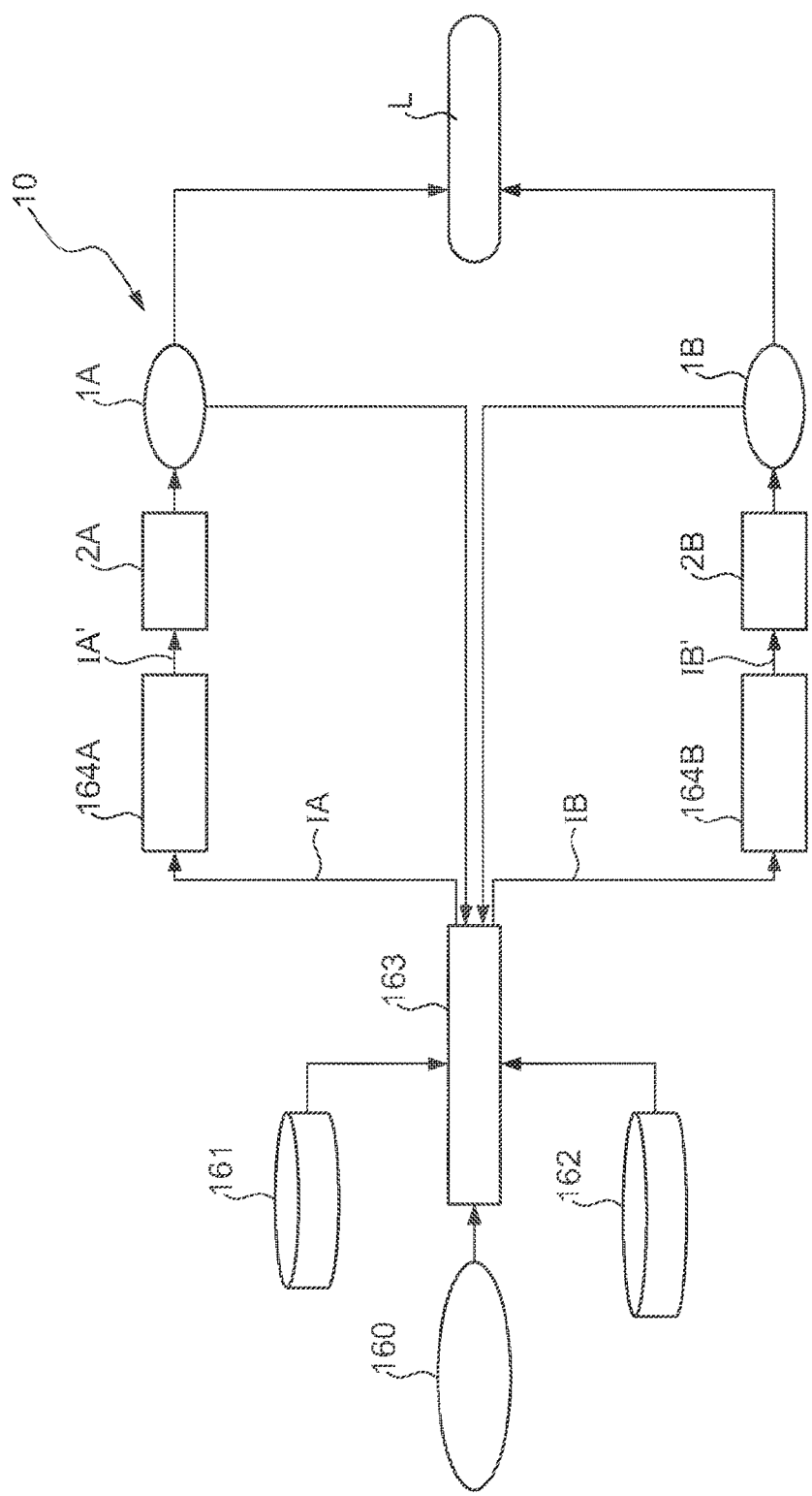
FIG. 17 shows a simplified block diagram of an embodiment of the inventive LED arrangement for driving two different colour arrays.

FIG. 17 shows a an embodiment of the inventive LED arrangement 10 for driving two different colour arrays 1A, 1B, for example for a dual colour flash. The diagram shows a specification source 160 that specifies the desired light on scene in terms of lumen and colour temperature. Information from an LED colour table 161 and an LED temperature table 162 is fed to a behaviour model 163, which computes a set of basic current pulse shapes IA, IB for the emitter arrays 1A, 1B. In temperature crosstalk correction modules 164A, 164B, the effect of a hot emitter neighbour is factored into each current pulse, and corrected current pulse shapes IA', IB' are forwarded to the matrix drivers 2A, 2B which apply the corrected current pulses (e.g. as shown in FIGS. 5, 11, 14) to the emitters. The result is a homogenous light output L on a scene with a desired colour temperature, even though the emitters heat up in response to current pulses. A product based on the embodiment shown in FIG. 17 will be characterized by very advanced control on account of the feedback mechanism, and may be relatively expensive.

Figure 18:
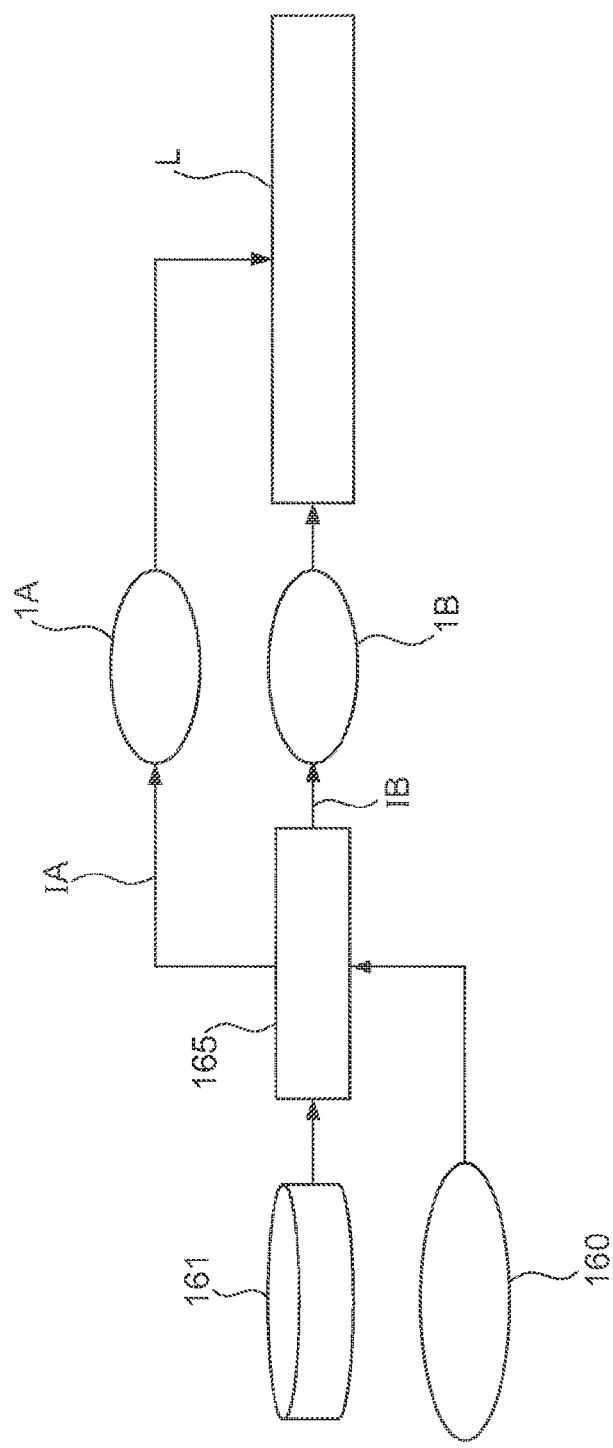
FIG. 18 shows a further simplified block diagram of an embodiment of the inventive LED arrangement.

FIG. 18 shows a more economical realisation. Here, a simpler feed-forward system is used, in which the emitters are divided into two groups 1A, 1B. In this embodiment, a split current module 165 deploys a split current algorithm that combines information from an LED colour table 161 with information from a specification source 160 to divide the available current into current pulse sets IA, IB for the two emitter groups 1A, 1B. The result is a relatively homogenous light output L on a scene. The LED colour table 161 can be compiled using information provided by a thermal environment module such as that described in FIG. 16. With a suitable LED colour table 161, the ratio of a first emitter colour to a second emitter colour during a current pulse can be determined, for example to adjust the ratio of warm white to cool white during a pulse sequence in order to achieve a uniform colour temperature distribution in the scene.

Although the present invention has been disclosed in the form of preferred embodiments and variations thereon, it will be understood that numerous additional modifications and variations could be made thereto without departing from the scope of the invention as described by the appended claims.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

What is claimed:

1. A display comprising:
    an emitter comprising a matrix of light emitting diodes;
    a thermal environment module configured to determine a thermal environment profile of the light emitting diodes, the thermal environment profile including thermal responses of each light emitting diode affected by others of the light emitting diodes;
    a current profile computation module configured to compute, for each light emitting diode based on the thermal environment profile, a current pulse profile tailored to a respective one of the light emitting diodes; and
    a driver configured to apply, to each light emitting diode, a current pulse with the computed current pulse profile for the respective light emitting diode to produce substantially uniform light output from the respective light emitting diode over a time interval of the current pulse even though a temperature of the respective light emitting diode changes during the current pulse.

2. The display according to claim 1, wherein a shape of the current pulse is substantially rectangular in which the current pulse monotonically increases from a start of the time interval to a later point of the time interval.

3. The display according to claim 2, wherein the current pulse monotonically increases from the start of the time interval to an end of the time interval.

4. The display according to claim 2, wherein the current pulse monotonically increases from the start of the time interval to a point at which the current pulse remains constant until an end of the time interval.

5. The display according to claim 1, wherein an increase of the current pulse varies with position of the respective light emitting diode within the matrix.

6. The display according to claim 1, wherein the current profile computation module is configured to use at least one previous pulse event to compute the current pulse profile.

7. The display according to claim 1, wherein the current pulse applied to at least two different light emitting diodes in the matrix have different pulse shapes.

8. The display according to claim 1, wherein a pulse shape of the current pulse reflects an increase in current over a time period of the current pulse.

9. The display according to claim 1, wherein the thermal environment module is configured to consider a thermal time constant of a sub mount or printed circuit board (PCB) on which the light emitting diodes are disposed to determine the thermal environment profile.

10. The display according to claim 1, further comprising a forward voltage measuring module coupled to the thermal environment module, the forward voltage measuring module configured to measure forward voltages of the light emitting diodes and provide the forward voltages to the thermal environment module, the thermal environment module configured to estimate actual temperatures of the light emitting diodes based on the forward voltages to predict a temperature behavior of the light emitting diodes.

11. The display according to claim 1, further comprising a split current module configured to deploy a split current algorithm that combines information from a light emitting diode color table with information from a specification source to divide available current into current pulse sets for two emitters, the light emitting diode color table to be compiled using information provided by the thermal environment module to determine a ratio of a first emitter color to a second emitter color during the current pulse to achieve a uniform color temperature distribution.

12. The display according to claim 1, wherein the light emitting diodes are micro-light emitting diodes.

13. A method of driving an emitter array in a display, the method comprising:
    determining a thermal environment profile of light emitting diodes in the emitter array, the thermal environment profile including thermal responses of each light emitting diode affected by others of the light emitting diodes;
    computing, for each light emitting diode based on the thermal environment profile, a current pulse profile tailored to a respective one of the light emitting diodes; and
    applying, to each light emitting diode, a current pulse with the computed current pulse profile for a respective one of the light emitting diodes to produce uniform light output from the respective light emitting diode over a time interval of the current pulse even in response to a change in a temperature of the respective light emitting diode changes during the current pulse.

14. The method according to claim 13, wherein a shape of the current pulse is substantially rectangular in which the current pulse monotonically increases from a start of the time interval to a later point of the time interval.

15. The method according to claim 13, wherein an increase of the current pulse varies with position of the respective light emitting diode within the array.

16. The method according to claim 13, further comprising using at least one previous pulse event to compute the current pulse profile.

17. The method according to claim 13, further comprising considering a thermal time constant of a sub mount or printed circuit board (PCB) on which the light emitting diodes are disposed to determine the thermal environment profile.

18. The method according to claim 13, further comprising:
    measuring forward voltages of the light emitting diodes; and
    estimating actual temperatures of the light emitting diodes based the forward voltages to predict a temperature behavior of the light emitting diodes.

19. A display comprising:
    a printed circuit board (PCB), the PCB comprising:
        an emitter comprising a matrix of light emitting diodes disposed on the PCB;
        a thermal environment module configured to determine a thermal environment profile of the light emitting diodes, thermal responses of each light emitting diode affected by a thermal time constant of the PCB and others of the light emitting diodes determined to form the thermal environment profile;
        a current profile computation module configured to compute, for each light emitting diode based on the thermal environment profile, a current pulse profile tailored to a respective one of the light emitting diodes; and
        a driver configured to apply, to each light emitting diode, a current pulse with the computed current pulse profile for the respective light emitting diode to produce uniform light output from the respective light emitting diode over an entire time interval of the current pulse even in response to a change in a temperature of the respective light emitting diode changes during the current pulse.

20. The display according to claim 19, wherein the PCB further comprises a forward voltage measuring module coupled to the thermal environment module, the forward voltage measuring module configured to measure forward voltages of the light emitting diodes and provide the forward voltages to the thermal environment module, the thermal environment module configured to estimate actual temperatures of the light emitting diodes based the forward voltages to predict a temperature behavior of the light emitting diodes.

* * * * *

UNITED STATES PATENT AND TRADEMARK OFFICE
CERTIFICATE OF CORRECTION

PATENT NO. : 11,800,610 B2
APPLICATION NO. : 17/873456
DATED : October 24, 2023
INVENTOR(S) : van Voorst Vader Page 1 of 1

It is certified that error appears in the above-identified patent and that said Letters Patent is hereby corrected as shown below:

In the Claims

In Column 12, Line 5, in Claim 13, delete "even" and insert --event-- therefor

In Column 12, Line 49, in Claim 19, delete "even" and insert --event-- therefor

Signed and Sealed this
Fifth Day of December, 2023

Katherine Kelly Vidal
*Director of the United States Patent and Trademark Office*